United States Patent [19]
Marimont et al.

[11] Patent Number: 5,809,179
[45] Date of Patent: Sep. 15, 1998

[54] PRODUCING A RENDERED IMAGE VERSION OF AN ORIGINAL IMAGE USING AN IMAGE STRUCTURE MAP REPRESENTATION OF THE IMAGE

[75] Inventors: David H. Marimont; Leonidas John Guibas, both of Palo Alto, Calif.

[73] Assignee: Xerox Corporation, Stamford, Conn.

[21] Appl. No.: 660,058

[22] Filed: May 31, 1996

[51] Int. Cl.$^6$ ....................................................... G06K 9/40
[52] U.S. Cl. ............................ 382/254; 382/173; 382/199
[58] Field of Search ..................................... 382/254, 173, 382/181, 190, 195, 199, 201, 203, 204; 358/448, 453

[56] References Cited

U.S. PATENT DOCUMENTS

| | | | |
|---|---|---|---|
| 4,631,690 | 12/1986 | Corthout et al. | 364/518 |
| 4,914,605 | 4/1990 | Loughmiller, Jr. et al. | 364/518 |
| 5,440,652 | 8/1995 | Ting | 382/165 |
| 5,485,568 | 1/1996 | Venable et al. | 395/155 |
| 5,499,322 | 3/1996 | Thirion et al. | 395/118 |
| 5,546,107 | 8/1996 | Deretsky et al. | 395/600 |
| 5,583,953 | 12/1996 | Harrington | 382/239 |

OTHER PUBLICATIONS

Nahred, A., and Peroche, B., "A 2 1/2-D hierarchical model based on planar maps", *Computer & Graphics*, vol. 20, No. 1, Jan./Feb. 1996, pp. 115–123.

Primary Examiner—Thomas D. Lee

[57] ABSTRACT

The invention automatically produces a rendered image version of an original image that accurately represents perceptually distinguishable objects, surfaces and edges in the original image. The original image is first converted to a unique data structure representation called an image structure map (ISM) that accurately, compactly and explicitly represents the geometry, topology and signal properties of perceptually distinguishable regions in the original image. The ISM is a dynamic partition of the image induced by a set of image region boundaries, and includes, for each region in the original image, a region data item that indicates the region boundary data items that form the region and a signal property descriptor indicating the value of signals computed for image locations in the region. An automatic segmentation operation determines image region boundaries occurring in the original image by analyzing discontinuities in signal values of original image locations. The topology of the rendered image version is accurate because vertices (endpoints and intersections) of image region boundaries are represented in the ISM in machine representable values that result from modifying exact vertex values using a rounding operation that mathematically ensures topological and geometric consistency with the original image. The method is particularly useful for producing rendered image versions of full color, continuous tone photographic images, and for producing line drawings of such images. The ISM representation of an image is, in most cases, more compact than its original raster form, and serves as a useful representation for archiving the image.

18 Claims, 18 Drawing Sheets

PRODUCING A RENDERED IMAGE VERSION OF AN ORIGINAL IMAGE USING AN IMAGE STRUCTURE MAP REPRESENTATION OF THE IMAGE

CROSS REFERENCES TO RELATED APPLICATIONS

The present invention is related to inventions that are the subject matter of previously filed, commonly assigned U.S. patent applications having the same inventors as the subject application and having the following serial numbers and titles: Ser. No. 08/XXX,XXX, "Image Structure Map Data Structure for Spatially Indexing an Image"; Ser. No. 08/581, 660, "User-Directed Interaction with an Image Structure Map Representation of an Image"; and Ser. No. 08/581,669, "Dynamic Computation of a Line Segment Arrangement Using Finite Precision Arithmetic." Each of these applications is hereby incorporated by reference herein as if set out in full.

BACKGROUND OF THE INVENTION

The present invention relates generally to a processor-based technique in the field of image understanding and representation, and more particularly, to a process for automatically rendering an accurate rendered image version of an original image from a compact data structure representation of the original image that accurately captures geometric, topological and signal information about regions in the image; the image rendered from the data structure shows image regions having perceptual significance to a human viewer.

Data structure representations of images in processor-controlled machines take on a variety of forms. A raster image or pixel map represents an image as a two-dimensional array of image locations, each location indicating a color. An image interaction application, such as Adobe Photoshop™ available from Adobe Systems Incorporated, of Mountain View, Calif., provides a variety of image interaction tools for editing raster images and permits a user to make selections of image areas, to adjust colors and to create complex image effects. The image interaction tools provided are implemented as pixel-based operations; that is, the tools operate directly on the pixel-based raster data structure.

The variety of ways that users need to interact with images in computer-implemented applications has motivated efforts to develop alternative data structure representations of images. One category of such data structures is produced by converting an image in its raster data structure form to a representation from which a line drawing of the image may be rendered. Adobe Streamline 3.0™, also available from Adobe Systems Incorporated, of Mountain View, Calif., is an example of a computer graphics tool that converts a raster image into a PostScript™ language data structure that represents a line drawing of the image. The software tool can be used to convert black-and-white line art, as well as color or grayscale images, including color photographic images, into the PostScript language image format, and from that format into different line art formats such as Adobe Illustrator™, Aldus Freehand®, PICT or DFX; images can be acquired directly from a scanner and imported into Adobe Streamline™, saving a user the work of copying or tracing the image by hand. Because the file size of an image converted into its output format using Streamline is much smaller than the image in its raster form, the Streamline image is a convenient format to use for archiving and printing. Editing functions are also provided by the Streamline software which permit a few basic editing operations; for more complex editing functions, PostScript language artwork can be copied and pasted between the Streamline application and other compatible Adobe image editing tools. The PostScript language image format provides an inclusion tree of image contours indicating differences in image color intensity and gives a containment relationship between the contours, analogous to a topological map of a land surface. The containment relationship means that image regions of a Streamline drawing image may overlap one another, with their rendering or painting order being determined by their specified containment relationship.

Colorize 2.0™ available from DS Design Inc. of Cary, N.C. is an interactive image application that permits a user to color a displayed black and white image that has been scanned from an original black and white image. The application displays the black and white image in the display area of a display device, and the user is then able to apply color to areas of the image using brush and paint-to-edge tools. The application has the capability to keep color within broken lines, and includes an Erase Fragment tool, which uses an edge detection capability to permit a user to erase a particular shape in the displayed image. These features suggest that this colorizing tool creates a higher level representation of the image being colored with which the user interacts.

Another data structure representation of an image is a vector representation which is simply a list of the positions of the line segments that represent edges in the image. These line segments are either manually provided or automatically determined by an image segmentation operation. A vector representation of an image may not accurately indicate the topology of the line segments when, for example, the vectorization shows gaps at junctions where line segments are supposed to meet or is otherwise of poor quality. A line drawing image rendered from a vector representation having such problems may not show image regions accurately.

A method for image coding is disclosed by M. Kocher and M. Kunt in "Image data compression by contour texture modeling" in Applications of Digital Image Processing, Andre Oosterlink, Andrew G. Tescher, Eds., Proceedings of the SPIE, 1983, pp. 132–139. Kocher and Kunt disclose a coding technique for gray level images based on the segmentation of the original image into regions whose gray level evolution contains no sharp discontinuities. Each region is then described by its texture and by its contour components. The texture coding scheme is composed of two steps: first, the general shape of the gray level evolution is approximated for each region by a 2-D polynomial function. Then, the noise of the original image, which was removed by a preprocessing operation, is approximated by a pseudo-random signal which is added to the polynomial description of each region in order to render the image more natural. The article shows images rendered from the coded representation of an original grayscale image that resembles a line drawing of the original, and that shows image regions colored according to the texture coding.

J. K. Yan and D. J. Sakrison disclose a two component code for gray-scale still images, in "Encoding of Images Based on a Two-Component Source Model", in IEEE Transactions on Communications, Vol. Com-25, No. 11Nov., 1977, pp. 1315–1322. The code separates the intensity function into two components: a discontinuous one representing intensity variation due to distinct objects (e.g., edges) and a continuous component due to such effects as texture. Each component is encoded separately and the two decoded components are combined at the receiver.

Still another type of image representation is a partition data structure of an image which represents the spatial relationship of disjoint (nonoverlapping) structures in the image called regions and indicates data describing both the geometric and the topological properties of a set of region boundaries (e.g., edges) that occur in the image. The geometric properties include the positions of the region boundaries in the image, typically specified by their endpoints (also called vertices), and the geometric definition of the region boundaries; the topological information indicates the incidence and adjacency of the vertices, region boundaries and regions that comprise the partition.

M. Garland and P. Heckbert, in "Fast Polygonal Approximation of Terrains and Height Fields," *Carnegie Mellon University Technical Report CMU-CS*-95-181, Carnegie Mellon University, Pittsburg, Pa., Sept., 1995, disclose a class of algorithms that take a height field as input, and approximate it with a mesh of triangles known as a triangulated irregular network (TIN). A triangulation is a partition in which each region has the standard shape of a triangle. A height field is a set of height samples over a planar domain. One common type of height field is referred to as terrain data, and is used in various computer graphics applications for flight and ground vehicle simulators, and in entertainment applications. An image having signals representing terrain data represents a rectangular section of terrain, and each pixel represents the height of the terrain at the pixel's x,y location. Several algorithms are disclosed and compared; each algorithm builds the triangulation incrementally by successively inserting vertices to create new triangles over multiple passes. Applications of the algorithm include fast rendering of terrain data for flight simulation using the triangulation, and the fitting of surfaces to range data in computer vision. FIGS. 7–10 at pp. 23–24 show the results of producing a triangulation of a digital elevation map (DEM), and FIGS. 24–26 at pg. 37 show the results of applying one of the algorithms to color image data. The data structure represents image regions as triangles; thus a line drawing produced from the data structure, such as the one shown in FIG. 26, will show the image divided into variously sized triangles, which will not necessarily represent regions in the original image that have perceptual significance to a human viewer of the image, as can be seen by comparing the line drawing of FIG. 26 with the original color image of an animal in FIG. 23.

M. Gangnet, J-C Hervé, T. Pudet and J-M Van Thong, in "Incremental Computation of Planar Maps," *Computer Graphics (SIGGRAPH'*89), Vol. 23, No. 3, 1989, pp. 345–354, disclose the use of a planar map to represent a partition of curves in a plane. A planar map is defined as a figure formed by a set of intersecting lines and curves that captures both the geometrical and topological information implicitly defined by the data. They further disclose a data structure and algorithms for incremental insertion of new curves provided by a user into the planar map, dynamically computing new intersections and updating the data structure using a finite precision implementation of a curve insertion algorithm. The disclosure only speaks to user-provided input line segments and curves, and does not discuss automatic segmentation of a given input image; a line drawing rendered from the data structure would show the line segments and curves entered by the user.

G. Koepfler, C. Lopez and J. M. Morel, in "A Multiscale Algorithm for Image Segmentation by Variational Method," *Journal of Numerical Analysis of the Society of Industrial and Applied Mathematics*, Vol. 31, No. 1 February 1994, pp. 282–299, disclose a fast and universal image segmentation algorithm that produces a hierarchy of image segmentations from fine to coarse scales. The algorithm computes a segmentation that is a partition of a rectangular image domain into a finite set of regions, each of which corresponds to a part of the image where a function g of the image is as constant as possible; the algorithm explicitly computes the region boundaries. A binary image of the image region boundaries may be produced from the partition, or a list of curves from the data structure may be produced which can then be rendered into a line drawing version of the input image.

Some of these image representations such as the image vectorization and the Streamline representation discussed above may provide an adequate or acceptable representation from which to render a line drawing of the image showing image regions having perceptual significance to a user, but they do not guarantee a robust, topologically consistent representation of the image. Other types of image representations discussed above, such as the triangulation data structure, produce a partition that captures the topology and geometry of image regions, but are not able to be used to render a line drawing version of the image showing image regions having perceptual significance to a user.

SUMMARY OF THE INVENTION

The method of the present invention takes as input an original image data structure in raster, or pixel form and automatically produces an accurate rendered image version of the original image from a data structure representation of the original image called an image structure map (which is also referred to in its abbreviated form as an ISM.) The rendered image version may be displayed on a display medium such as paper or a display screen. Alternatively, the image structure map may be written to a file and stored in memory or in a data base of similar data structures for later rendering of the image. In the discussion of the present invention, the term "rendered image version" or "rendered image" of the original image is used to refer to the image rendered from the image structure map data structure representation of the raster form of an input original image, and will include all versions of that rendered image. In the context of the present invention, an accurate rendered image version of an original image is an image that shows image regions that represent perceptually distinguishable image regions in the original image, as seen by a human viewer of the image; these perceptually distinguishable image regions are also of perceptual significance to the human viewer, and typically include objects, surfaces of objects, and edges that separate objects from one another in a scene. The rendered image version may show uncolored image regions, in which case the rendered image will resemble a line drawing of the edges in the original image; or the image regions in the rendered image may show color, such as black and white, shades of gray or partial or full color. For example, the invention may be used to produce a rendered image version of a full color photographic scene that has been digitally captured as the original input image; the rendered image version will show each image region having a color representative of the color signals in the area of the original image represented by the respective image region.

An image structure map representation of an image is a data structure that indicates a partition of the image into image regions and, for each image region, includes a signal property descriptor. A partition includes data indicating the image region boundaries, the vertices (endpoints of image region boundaries and intersections between image region boundaries) and the image regions of the image, the vertices adjacent to each image region boundary, and the image region boundaries and vertices adjacent to each image region. The signal property descriptor for a respective image region indicates a signal value assigned to the signals in that image region; the signal value of the signal property descriptor may be computed using the signals in the area of the input original image represented by the respective image region.

In order to produce a rendered image version of an input original image that is meaningful to a human user, a signal analysis operation detects image regions and their boundaries in the original image by detecting a smoothly varying property of the signal in the image that is perceptible to a human user viewing the image. The image regions determined by the signal analysis operation correspond to image regions in the original image that are perceptually significant or perceptually distinguishable to the user.

Because it is rendered from the image structure map representation, the resolution of the rendered image version of an original image is independent of the resolution of the original image, and an accurate rendered image version can be rendered for any type of output display device without distortion. The rendered image version can also be presented at any desired scale.

There are several unique features of the image structure map representation of the image which collectively contribute to producing an accurate rendered image version of the image. The first of these is that the ISM represents image regions in the original image at two distinct levels. The first level is a high level region data structure that represents each image region in the original image that is perceptually significant or perceptually distinguishable to the user, as determined by the signal analysis operation. Rendering the rendered image version using this region data produces image regions in the rendered image that give the rendered image a distinctive and accurate resemblance to the original image.

The image regions represented by the first level region structure tend to be irregularly and arbitrarily shaped since they represent objects, surfaces or edges in the original image. If regions were only represented as having these irregular shapes, building the partition would not be as efficient as it needs to be for most applications. To ensure that the partition can be built efficiently, each image region is further subdivided in the data structure into subregion areas, each of which is referred to as a "bounded complexity region", or more simply as a cell. A bounded complexity region has a standardized geometric shape having a fixed or predetermined number of sides. One way to implement bounded complexity regions when the image region has an irregular, nonstandard geometric shape is to add structures called attachments to locations within an image region to divide the image region into cells.

A second feature of the image structure map representation of the image that contributes to producing an accurate rendered image version of the original image is that the ISM, as a partition data structure, explicitly represents the geometric and topological information in the input image, in contrast to a vector representation of an image which does not explicitly contain such information. More importantly, however, the ISM of the present invention, in contrast to other implementations of partition data structures, accurately and robustly represents this geometric and topological information by using a finite precision model of computer arithmetic to represent vertices in the image. Algorithms that construct partitions may use an infinite precision or a finite precision model of computer arithmetic when operating on image locations; using an infinite precision model produces image locations of features in the partition, such as vertices, that may be inaccurate as a result of rounding errors if these image locations are subsequently used in computations. This in turn results in a partition that is not topologically consistent with respect to the positions of and intersections among original region boundaries in the original image. For example, repeated rounding of the location of an intersection of two region boundaries that results from infinite precision computations could produce a representation of the location of the intersection in the partition data structure that is unacceptably distant from the actual location of the intersection of the original region boundaries. In a rendered image version of the image produced using the image region boundary intersection having the erroneous location, that part of the scene would be distorted and would not accurately represent the original image.

An image rendered from the image structure map representation according to the present invention accurately shows the locations of image structures and their geometric and topological relationships to other image structures because the operation that builds the partition of the input original image insures that intersections and endpoints of image region boundaries in the ISM data structure have locations specified in machine representable numbers that are topologically and geometrically accurate. Two important operations are needed to accomplish this: First, exact locations of the intersections and the endpoints of input region boundaries are rounded to representable points using a mathematically rigorous rounding operation. The rounding operation perturbs the exact locations of all vertices of the image partition to lie on representable points on an integer grid. One consequence of this perturbing is the breaking up of an original image boundary into pieces, called fragments. In order to ensure that the perturbed partition has a topology consistent with the original image, additional points on image boundaries in the partition are perturbed to the grid as well; the rounding operation specifies which points these are and to which representable points they should be perturbed. In the end, all vertices, edges, and faces of the resulting perturbed partition have accurate representations with finite arithmetic.

Secondly, the original locations of the input region boundaries in the input original image are stored in the image structure map data structure to ensure that the rounded image region boundaries are topologically consistent with the original input region boundaries. When a new image region boundary is inserted into the partition, intersection locations of the new image region boundary with existing image region boundaries in the data structure are determined using data indicating previously inserted unrounded region boundaries rather than their rounded fragment counterparts. Using the unrounded region boundaries prevents the region boundaries from "drifting" to locations in the image structure map that are no longer topologically consistent with the location of the region boundary in the original image. Once the image structure map representation of an image has been dynamically created, if no further dynamic editing of the data structure is to take place, the unrounded image region boundaries may be removed from the data structure.

The partition data structure that forms the basis of the ISM is considered to be a dynamic partition. A dynamic partition is built for one or more region boundaries, and then may be dynamically updated with added or deleted region boundaries, with no requirement to know a priori the locations of the entire set of region boundaries that comprise the image structure map.

In one embodiment of the present invention, the image structure map is dynamically produced using a dynamic, incremental planar partition algorithm that builds the partition by adding one image region boundary at a time into the data structure. The dynamic nature of the operation that produces the image structure map means that both the region structures as well as the signal property descriptors for the regions can be edited at any time. Thus, the dynamic image structure map representation of an image supports basic image interaction operations, including insertion and deletion of image region boundaries, computation of and changes to signal properties of image regions, and queries about image structures. These basic operations may in turn be combined to accomplish more complex interactions. When a particular image application requires it, the ISM data structure provides for much more powerful interaction with an image than is available to a user by merely manipulating the pixel data of the image.

A significant advantage of producing a rendered image version of an original image according to the present invention is that the image structure map representation of the original image is compact in comparison with the original image data structure; this is because the image structure map represents a smoothly varying signal property of each image region in a very compact form, thus eliminating much redundancy in the image signal. When an image is characterized by having homogeneous regions with sharp boundaries, such as a full color image, an image structure map representation represents the color for an entire region of pixel locations with a single value or with a matrix of parameters. The advantages of a compact image representation are achieved without significant loss of image information content; because the image structure map makes the geometric and topological structure of an image explicit, an image rendered from the image structure map still conveys substantial information about the objects in the original image, their spatial relationships to each other, and the signal properties of their regions. Thus, the ISM representation may serve as a useful substitute for the raster form of the original image for archiving purposes.

Therefore, in accordance with one aspect of the present invention, there is provided a method for operating a processor-controlled machine to present a rendered image version of an input original image on a display device. The machine operated by the invention includes image input circuitry for receiving image definition data defining the input original image, memory for storing data, output circuitry connected to the display device, and a processor connected for accessing instruction data stored in the memory for operating the machine. The processor is also connected for receiving the input original image from the image input circuitry, and is connected for providing image definition data defining images to the output circuitry for presenting the rendered image version on the display device. The method includes operating the processor of the machine to perform an automatic image segmentation operation using the input original image. The automatic image segmentation operation determines image region boundaries occurring in the input original image between image regions therein by detecting a discontinuity in a value of a smoothly varying signal property of signal values indicated by original image locations in the original image. An image region in the original image is indicated by a coherent area of image locations in the original image having a substantially similar value of a smoothly varying signal property. An image region boundary occurs at the discontinuity in the smoothly varying signal property of the signal values indicated by the original image locations.

The image region boundaries determined by the automatic image segmentation operation are then used to produce an image structure map data structure representation of the original image. The image structure map is a partition of a 2D plane induced by the set of image region boundaries into a plurality of nonoverlapping image regions included in the original image. The image structure map is produced dynamically by inserting image region boundaries one at a time, and includes, for each respective image region in the original image, a region data structure including region boundary data items each indicating an adjacent image region boundary of the respective image region. The region data structure also includes a plurality of vertex data items each indicating a vertex location adjacent to a region boundary data item included in the region data structure; a vertex location refers to an endpoint location of a respective one of the image region boundaries or an intersection location between two image region boundaries. Each vertex data item has a machine representable value when stored in the image structure map that is a computed value computed by applying a particular type of rounding operation to the exact value for the vertex location of the respective image region boundary, thereby modifying the exact value to produce the machine representable value. The exact value is typically the result of performing infinite precision arithmetic to compute an intersection location, for example, and requires a higher precision to represent accurately. Modifying the vertex location of an image region boundary according to the rounding operation produces a rounded image region boundary represented by the region boundary data item. The image structure map is then used to render a rendered image version of the original image that shows the image regions determined to be included in the original image, and the rendered image version of the original image is then presented on a display device. One form of the rendered image version resembles a line drawing of the original image.

The novel features that are considered characteristic of the present invention are particularly and specifically set forth in the appended claims. The invention itself, however, both as to its organization and method of operation, together with its advantages, will best be understood from the following description of the illustrated embodiment when read in connection with the accompanying drawings. In the Figures, the same numbers have been used to denote the same component parts or steps. The description of the invention includes terminology that is specifically defined for describing the embodiment of the claimed invention illustrated in the accompanying drawings. These terms have the meanings indicated throughout this specification and in the claims, rather than any meanings that may occur in other sources, such as, for example, documents, if any, that are incorporated by reference herein elsewhere in this description.

DETAILED DESCRIPTION OF AN ILLUSTRATED EMBODIMENT OF THE INVENTION

A. The Machine Environment of the Invention.

Figure 1:
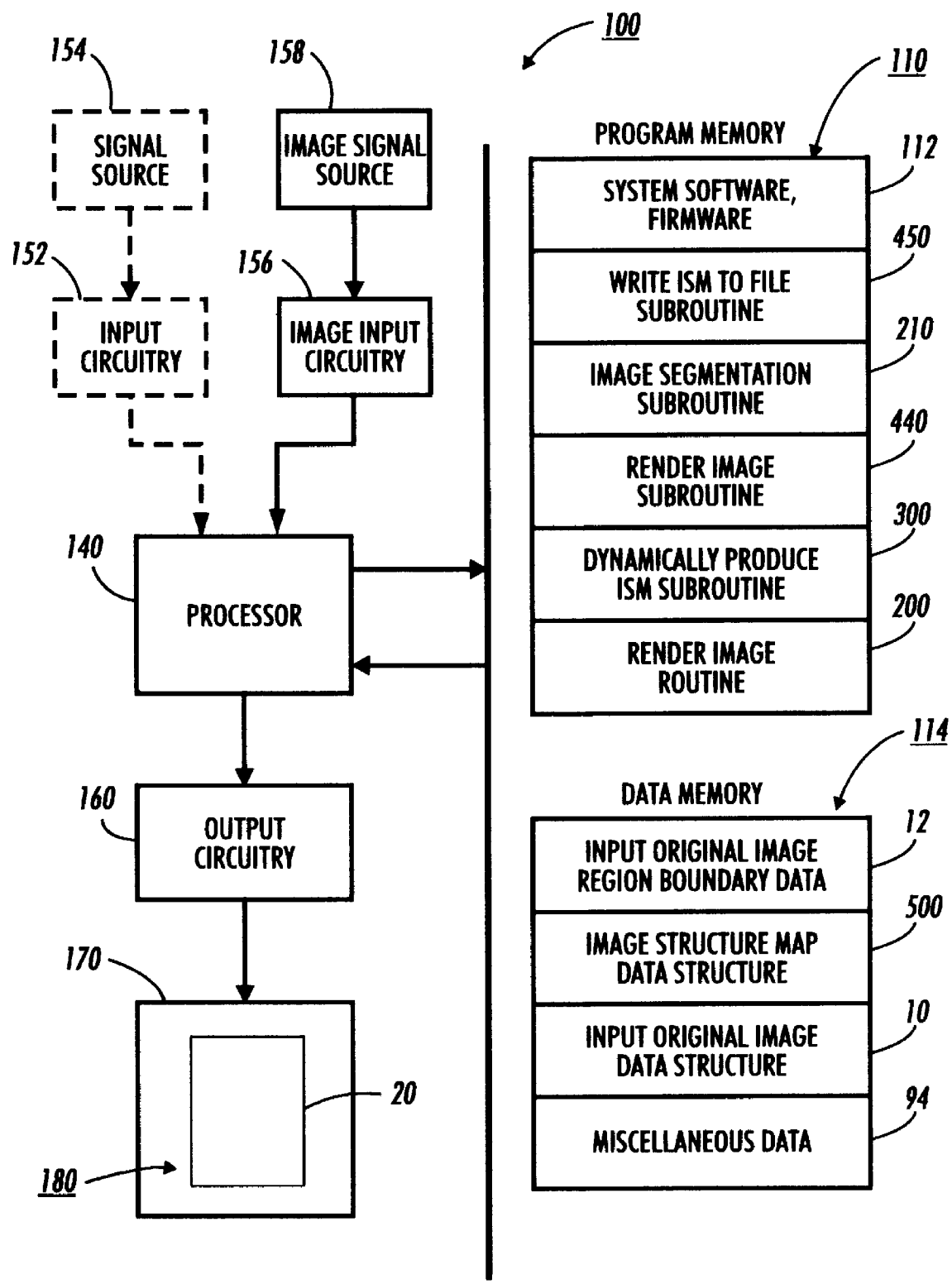
FIG. 1 is a simplified block diagram illustrating a machine in which the present invention may be used.

FIG. 1 is a block diagram of a generalized, processor-controlled machine 100; the present invention may be used in any machine having the common components, characteristics, and configuration of machine 100, and is not inherently related to any particular processor, machine, system or other apparatus. The machine or system may be specially constructed for the purpose of carrying out the invention, or it may comprise a general purpose computer selectively activated or reconfigured by a computer program stored in the computer.

Machine 100 includes image input circuitry 156 which receives signals defining an original image definition data structure from an image signal source 158. Image signal source 158 may be any image capture device, such as a scanning device, a digital camera, or an interface device that produces a digital image definition data structure from another type of image signal. These input image signals are forwarded via input image circuitry 156 to processor 140 and may be stored by processor 140 in data memory 114. Machine 100 may, but need not, include input circuitry 152 for receiving signals from a signal source 154. Such sources include user interaction devices controllable by a human user that produce signals in response to actions by the user, such as a pointing device or a keyboard. Another type of user interaction device is a stylus device that the user moves over a special data collecting surface, which might be display area 180 of device 170, when device 170 is a display device such as an LCD display. When these input signals are present, they are also forwarded via input circuitry 152 to processor 140 and may be stored in data memory 114. Machine 100 includes device 170, a conventional display device capable of presenting images. Device 170 may be a cathode ray tube, a liquid crystal display (LCD) device, a printing device, or any other device suitable for presenting images. The rendered image version of an original image is produced by processor 140 and provided to device 170 via output circuitry 160.

Processor 140 operates by accessing program memory 110 to retrieve instructions, which it then executes. Program memory 110 includes render image instructions 200 that implement the functions shown in flowchart 200 of FIG. 2, and may include instructions that implement the embodiment of the invention described in the flowcharts of FIGS. 15 through 20. Program memory 110 includes instructions for the subroutines needed to render the rendered image version of an original image according to render image instructions 200. During execution of the instructions, processor 140 may access data memory 114 to obtain or store data necessary for performing its operations. Data memory 114 stores a local copy of the image structure map data structure 500 which would include vertex data structures 510 of the type shown in FIG. 9, fragment data structures 540 of the type shown in FIG. 10, and region data structure 502 of the type shown in FIG. 11. Data memory 114 may also store original image definition data structure 10 and input image region boundary data 12 received as output from automatic segmentation operation 210. Data memory 114 also stores various other miscellaneous data, including, for example, the list of new hot pixels produced by operation 310 of FIG. 16 when machine 100 constructs an ISM according to the illustrated embodiment shown in FIGS. 15 through 20.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility (not shown.)

An embodiment of the present invention has been implemented in software programs on a Silicon Graphics Indigo Elan computer running the Irix operating system, available from Silicon Graphics, Inc. (SGI) of Mountain View, Calif. The software programs implementing the invention are written in Allegro Common Lisp, a compiler for which is available from Franz Inc. of Berkeley, Calif. the implementation uses the standard SGI Graphics Library supplied with the Irix operating system and a Common Lisp interface to the Graphics Library that Franz distributes. It will be apparent to those of skill in the art that a variety of programming languages and hardware configurations could readily be used in place of those in the illustrated embodiment based on the description herein without departing from the scope and intended utility of the present invention.

B. Features of the Invention.

The description of this illustrated implementation presumes a knowledge of the fundamental principles of planar partition algorithms in general, and of algorithms for constructing trapezoidal decompositions in particular. One of many useful texts in this regard is *Computational Geometry: An introduction Through Randomized Algorithms*, by Ketan Mulmuley (Prentice-Hall, 1994). Several sections of that text discuss trapezoidal decompositions; several other sections of that text are useful as background; in particular, chapter 2 at pp. 29–35, 52–55, 58–66, and 78–96; chapter 3 at pp. 111–114 and 117–119; chapter 4 at pp. 126–135, 140–149, and 162–167; and chapter 5 at pp. 192–210 are all hereby incorporated herein by reference as if set out in full.

The present invention makes use of a method for dynamically producing a planar partition induced by a set of line segments, developed by the named inventors herein. While many of the details of this method are discussed below, additional information about this method may be found in Ser. No. 08/581,669, "Dynamic Computation of a Line Segment Arrangement Using Finite Precision Arithmetic," and in Ser. No. 08/IXXX,XXX, "Image Structure Map Data Structure for Spatially Indexing an Image." In addition, further information about this dynamic partition method may also be found in L. Guibas and D. Marimont, "Rounding Arrangements Dynamically," in *Proceedings of the 11th ACM Symposium on Computational Geometry* (SCG '95), Vancouver, B.C., Jun., 1995, which is hereby incorporated by reference herein as if set out in full.

Figure 2:
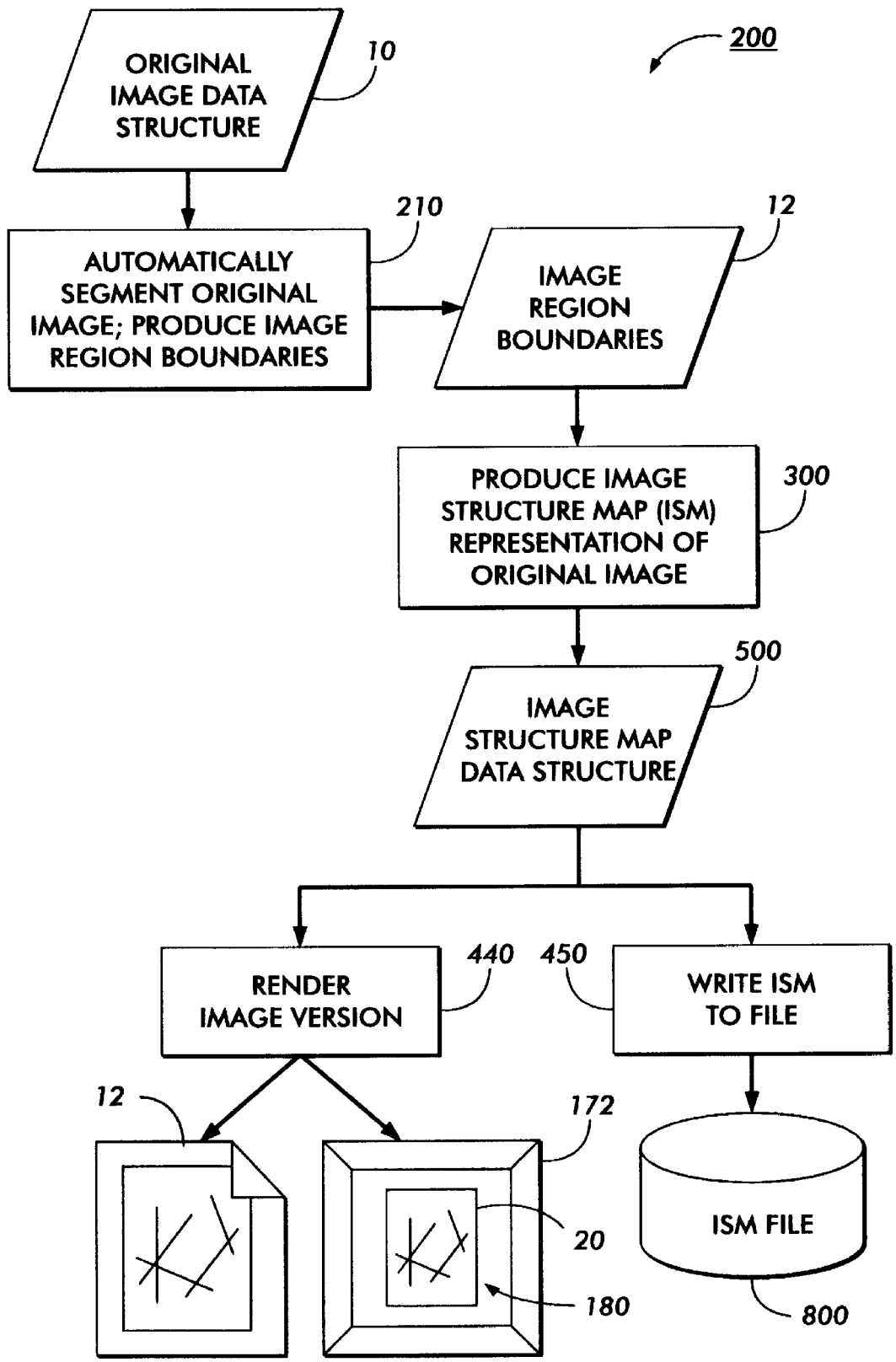
FIG. 2 is a flowchart illustrating the component acts of the method for rendering a rendered image version of an original image according to the invention.

FIG. 2 is a flowchart illustrating the component data structures and acts of process 200 for rendering a rendered image version of an original image according to the invention. Each of the following sections discusses a component of FIG. 2.

1. Original images.

Figure 3:
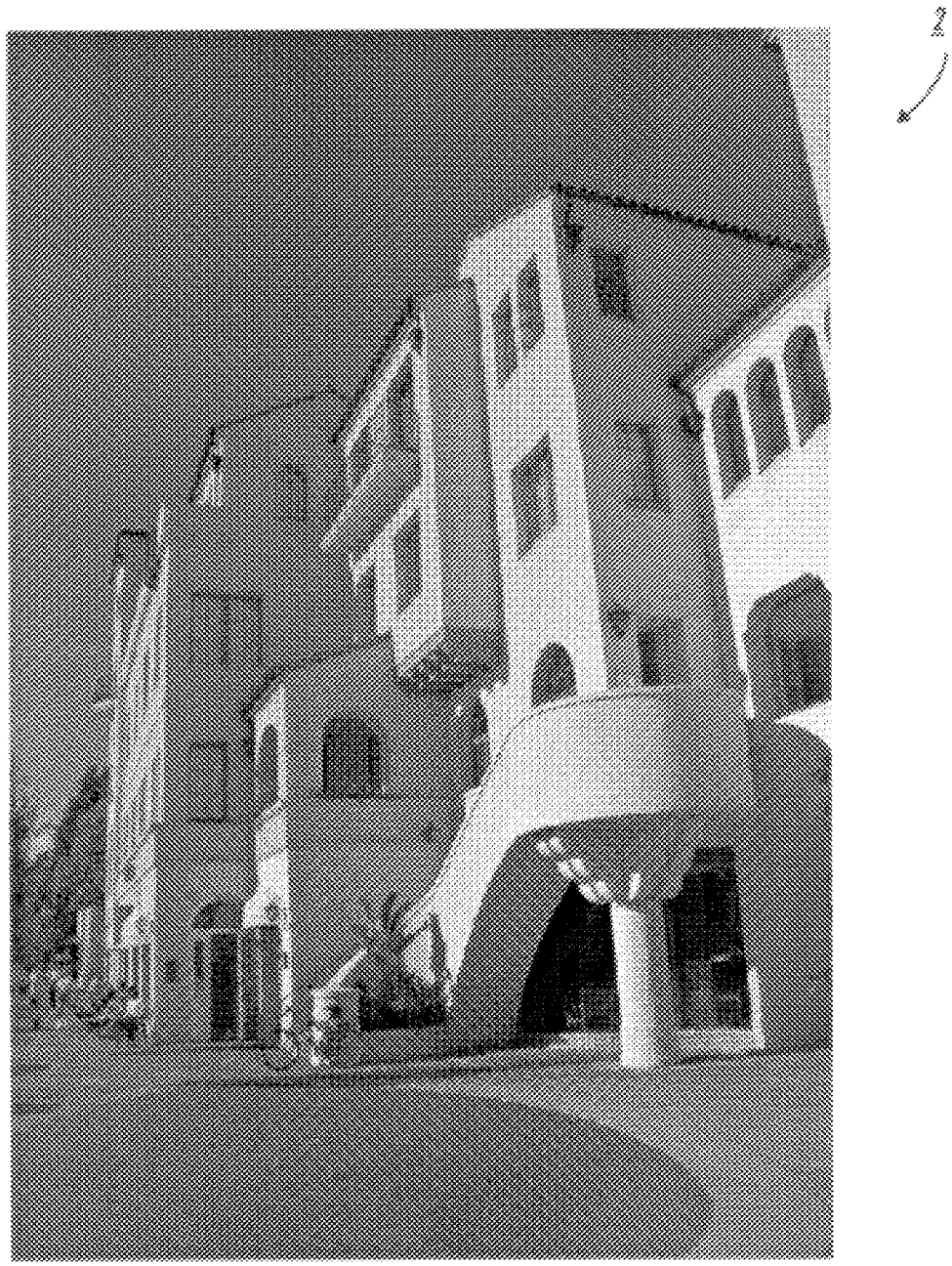
FIG. 3 illustrates an original image that is suitable for input to the present invention, and is suitable for representation as an image structure map produced according to the present invention.

Original image definition data structure 10 is input to process 200. An "image definition data structure" includes data indicating a one-to-n dimensional signal sampled from an image in a two-dimensional (2D) domain in a regular fashion. The present invention accepts a wide variety of digital images as an input original image. FIG. 3 shows image 2 which is a continuous tone image; the image definition data structure of image 2 was produced by using a film scanner to scan a film negative image to produce a digital image definition data structure in Kodak® PhotoCD format which was then stored on an optical storage medium. Other types of original image data include data from continuous-tone printed images captured by a scanning operation, or produced directly by a digital camera, or produced from hardware that digitizes image data from a video camera. Data indicating a synthetic, or computer-generated, image is also suitable as an original image. Printed halftone images may also be suitable, provided that a suitable blurring function can be applied to the image signals to produce smoothly varying signals in image regions.

Original image 2 of FIG. 3 shows a photograph of a natural scene. While the present invention is particularly suited to representing natural images and producing a rendered image version thereof, the present invention is not limited to representing only natural images. Images that indicate other types of subject matter, such as those containing graphical objects, may also be suitable. For example, maps, engineering drawings, architectural renderings, scientific illustrations, presentation and business graphics, synthetic (computer generated) two- or three-dimensional images and digitized artwork are all suitable for use as an input image in the present invention.

2. Automatically segmenting the original image to produce image region boundaries.

With reference again to FIG. 2, original image 2 of FIG. 3 is input to process 210 which is a signal analysis operation that automatically detects image regions in original image 2 and segments original image 2 to produce image region boundaries 12. An image region, as the term is used herein, is an area or portion of the image definition data structure representing the input image in which some property of the image signals in the area is smoothly varying over the area. An image region boundary, as the term is used herein, indicates an area or portion of the image definition data structure between two image regions. Examples of image region boundaries are curves and line segments. By definition herein, an image region does not include its image region boundaries. The detection of an image region boundary or an image region in an image is therefore a function of the particular signal analysis operation used to analyze the signals in the image to find the smoothly varying signal property; different signal analysis operations may produce different sets of image region boundaries and image regions when analyzing the same image. For this reason, an image region boundary or an image region is said to be "determined to be included in the original image" to indicate the dependence of the presence and extent of the boundary or region on the result of the signal analysis operation. The details of this automatic segmentation operation as implemented in the illustrated embodiment are discussed below.

3. General data organization of the image structure map.

The set 12 of image region boundaries produced as a result of automatic segmentation operation 210 is then used to produce an image structure map data structure representation 500 of original image 10. In general terms, image structure map data structure 500 (or simply, image structure map, abbreviated ISM,) is a data structure that indicates a partition of original image definition data structure 10 into image regions and, for each image region, includes a signal property descriptor which is a data item that indicates the value assigned to signals in the image region represented in the image structure map.

As noted in the summary above, a partition includes data indicating the vertices, image region boundaries and image regions of an original image, the vertices adjacent to each image region boundary, and the image region boundaries and vertices adjacent to each image region. A vertex is an image region boundary endpoint or an intersection between two image region boundaries. An image region boundary is adjacent to a given image region when the image region boundary is an image region boundary of that image region; a vertex is adjacent to an image region or to an image region boundary if the vertex is contained in the image region boundary. A partition of an original image indicates data describing both the geometric and the topological properties of the set of region boundaries determined to be included in the original image. The geometric properties include the positions of the region boundaries determined to be included in the image, typically specified by their endpoints, and the geometric definition of the region boundaries; the topological information indicates the incidence and adjacency of the vertices, region boundaries and regions that comprise the partition. The partition produced for a given original image is a function of the image region boundaries provided as input to the partition building process; thus, an original image may be represented by different partitions, and there is no single unique partition for a given original image. A partition of a whole or part of the original image into image regions is said to be "induced" by a given set of image region boundaries.

Figure 4:
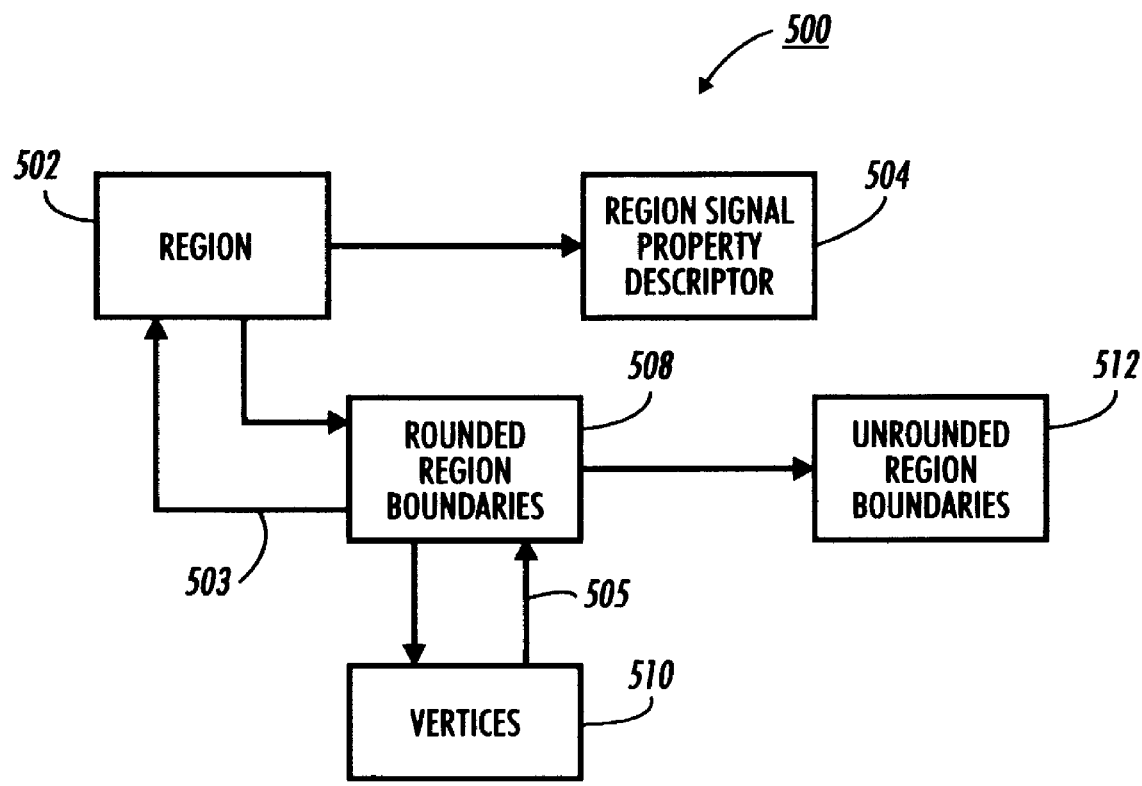
FIG. 4 is a block diagram showing the general data organization and relationships of an image structure map data structure produced according to the present invention.

In its most general form, image structure map 500 has the data organization and relationships shown in the general block diagram of FIG. 4. At the top level of data structure 500, each region identified in the image is represented by a region data structure 502 that indicates a region signal property descriptor 504. The term "indicates" as used in this description and in the claims has several meanings, which can be determined in a particular instance by the context of its use. An item of data is said to "indicate" a thing, an event, or a characteristic when the item has a value that depends on the existence or occurrence of the thing, event, or characteristic or on a measure of the thing, event, or characteristic. A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. When an item of data can indicate one of a number of possible alternatives, the item of data has one of a number of "values." An item of data "includes" information indicating a thing, an event, or a characteristic if data indicating the thing, event, or characteristic can be obtained by operating on the item of data.

Each region data structure 502 represents an image region in original image 10 and indicates the image region boundaries adjacent to the region; each of these image region boundaries is represented by a region boundary data structure 508. Each region boundary data structure 508 also indicates the regions to which it is adjacent, shown by arrow 503 pointing from region boundary data structure 508 back to region data structure 502. Each region boundary data structure 508 indicates the vertices adjacent to boundary 508; each of these vertices is represented by a vertex data structure 510, and each vertex also indicates the region boundaries to which it is adjacent, shown by arrow 505 pointing from vertex 510 back to region boundary data structure 508. An image region, an image region boundary or a vertex determined to be included in original image definition data structure 10 is also referred to herein in an abbreviated manner as an "image structure."

Each region boundary data structure 508 points to vertices (endpoints) whose coordinate values are computed and stored as machine representable numbers using a rounding operation. Thus, region boundary data structure 508 is referred to in FIG. 4 as a rounded region boundary data structure. During construction of the ISM, each rounded region boundary data structure further indicates the endpoint coordinates of its original image region boundary, which is referred to as unrounded region boundary 512. As explained in more detail below in the discussion of the rounding operations, unrounded region boundaries are used for purposes of computing intersections with original image region boundaries that are being inserted into the image structure map 500.

4. Rendering a rendered image version of the original image using the image structure map representation.

With reference again to FIG. 2, once image structure map 500 is produced, rendering operation 440 renders the rendered image version of original image 10 using image structure map 500. The rendered image version may by presented in printed form, shown in FIG. 2 as rendered image version 12, or may be displayed on screen display device 172 in display area 180, shown as rendered image version 20. The image structure map may also be written to a file and stored in memory, as shown in FIG. 2 in box 450, in addition to, or in place of, rendering the rendered image version of original image 10.

Rendering operation 440 maps data items in image structure map 500 to display features or display objects in the rendered image. The term "display feature" refers to any human perception produced by a display device, and includes a single display feature and also may include plural display features that together form a pattern of display features in an image. A display feature "represents" a data item or a body of data when the display feature can be mapped to the data item or to data items in the body of data. Similarly, an item of data "is represented by" a display feature to which it is mapped.

Figure 5:
FIG. 5 illustrates a rendered image version of the image of FIG. 3, rendered from the image structure map data structure representation and showing only regions and region boundaries, such that the rendered image version of the original image resembles a line drawing.

FIG. 5 shows rendered image version 24 produced by rendering operation 440 using data included in the image structure map data structure that represents original image 2 of FIG. 3. There are substantial visual similarities between rendered image version 24 and image 2 of FIG. 3; the extent of the visual similarity between rendered image version 24 and original image 2 is dependent on the level of detail and accuracy of image region boundary data 12 (FIG. 2) that is included in the image structure map representation of the image. FIG. 5 shows the image regions only, and does not show the values of the signal property descriptors in the image regions. Rendered image version 24 resembles a line drawing version of original image 2; it can be seen that this version of original image 2 shows the shapes of the regions and their relative positions to one another, conveying a great deal of information about original image 2.

Figure 6:
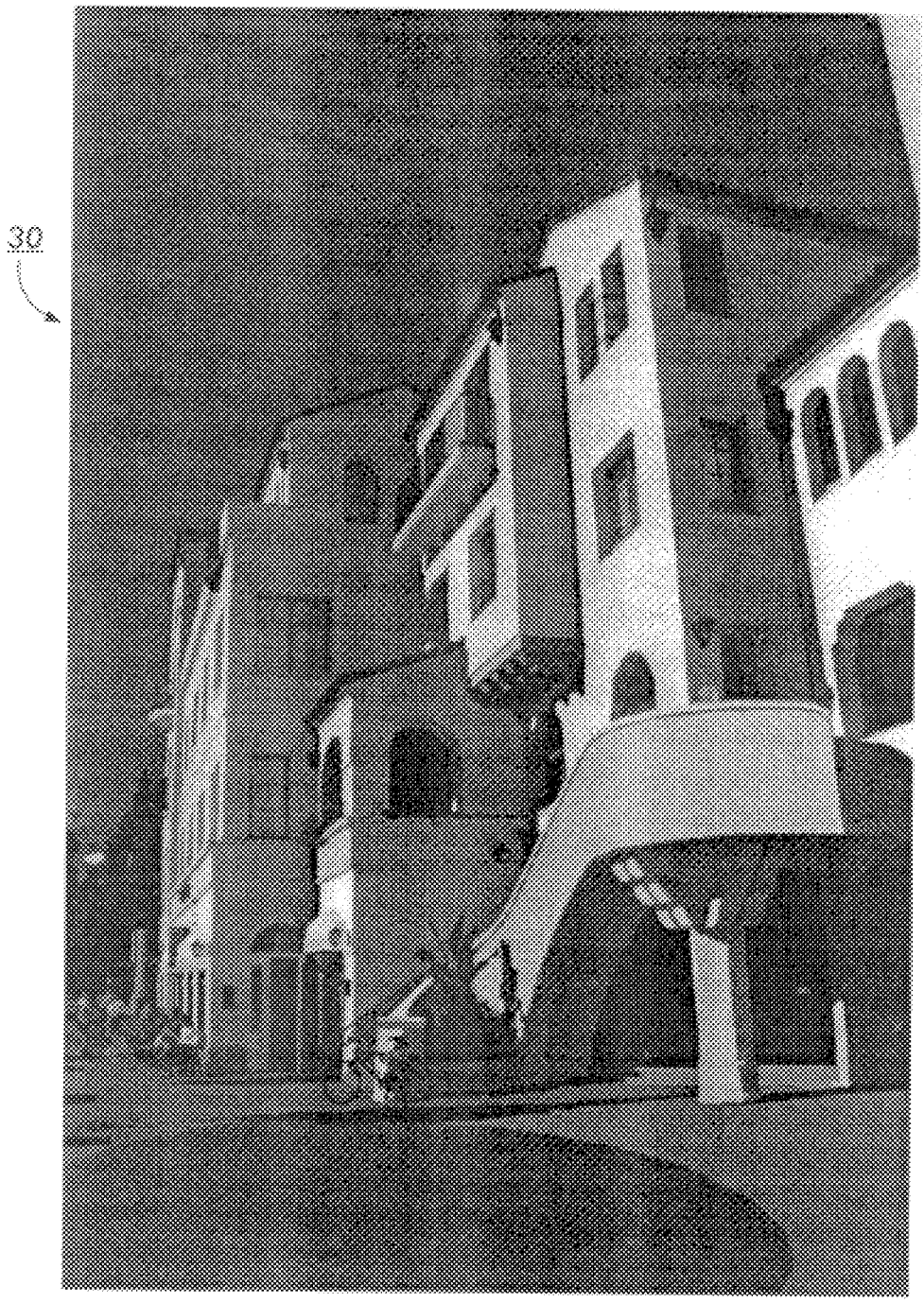
FIG. 6 illustrates another rendered image version of the image of FIG. 3, rendered from the image structure map data structure representation and showing image regions and a visual representation of the signal property descriptor of each image region.

FIG. 6 shows another rendered image version 30 of the image structure map representation of original image 2 of FIG. 3. FIG. 6 shows the image regions with the respective values of their signal property descriptors in the image regions, and does not show the thin black lines that are the explicit image region boundaries shown in FIG. 5. The substantial visual similarities between rendered image version 30 and image 2 of FIG. 3 make rendered image version 30 a suitable substitute for original image 2 in many applications.

5. Storing the image structure map representation of the original image as a compressed image representation.

The ISM data structure representation of the original image may also be stored in a file, for later display of the rendered image version of the original image. The stored file includes region information, the color descriptors and some additional information to associate the color descriptor with its respective region in the ISM. The unrounded image region boundaries may also be stored if the ISM is going to be used to support further interactive operations with a user. If the ISM is being stored solely for the purpose of subsequent rendering of the rendered image version of the original image, the unrounded image region boundaries may be removed from the ISM data structure prior to storing in the file.

The ISM may serve as a useful alternative representation to storing the original image because its file size is smaller than the original image. The compression ratio of the ISM—that is the ratio of the size of the image file to the size of the ISM file—depends on a number of factors that include the level of detail in the image relative to the image's resolution, and how much of that detail is captured in the ISM. The detail in the image is a function of the number of image regions, and the length and the smoothness of the region boundaries, where the shorter and smoother the boundary, the fewer line segments required to represent them. How much of that detail is captured in the ISM depends on the automatic segmentation operation that is used to generate the region boundaries, the parameters supplied to the automatic segmentation operation, and the amount of manual segmentation, if any, performed by a user on the output of the automatic segmentation operation.

Photographic image 2 in FIG. 3 has 512 by 768 pixels, with 24 bits per pixel of color information, and requires 1180 KB (kilobytes) to store. The image structure map representation of image 2 has 5969 image region boundaries (ursegments) and 1424 regions, which along with the information to associate the region color descriptor with its respective region in the ISM, requires 187 KB to store. The compression ratio is therefore 6.3:1.

C. Details of the Illustrated Implementation.

1. Automatic segmentation of the original image.

The illustrated implementation of the present invention uses automatic image segmentation software called MegaWave2 as process 210 of FIG. 2 to determine the image region boundaries that occur in original image definition data structure 10. MegaWave2 is available by license for research purposes from Ceremade, URA CNRS 749 de l'Universite Paris-IX Dauphine, 75775 Paris cedex 16, France, and carries a copyright for the preprocessor of ©1988–1994 Jacques Froment, Paris-IX Dauphine University, and a copyright for the software modules of ©01993–1994 Jacques Froment and Sylvain Parrino, Paris-IX Dauphine University.

MegaWave2 includes a collection of image processing algorithms described as C functions that operate without any assumption about the context in which the modules are executed. A MegaWave2 compiler is comprised of a MegaWave2 preprocessor followed by a standard C compiler that creates from a module a run time command, a function of a library or a function to be run under a window-oriented interpreter. The licensed software includes the source code of the modules, the system libraries (object code only), the preprocessor (in executable form), documentation, and some utilities. The libraries and preprocessor are available for Hewlett Packard HP-UX A.09 and Sun Microsystems Sparc SunOS 4.1 machine architectures and operating systems.

MegaWave2 includes a module that implements the color image segmentation algorithm disclosed in the paper by G. Koepfler, C. Lopez and J. M. Morel that is briefly described above in the background discussion; this paper is hereby incorporated by reference herein as if set out in full.

The color image segmentation software provided by MegaWave2 takes as input a color image, the number of regions desired for the segmentation, and three weights on the RGB components of the image that are used to compute an error measure. The software searches for the minimum of an objective function that takes into account the error in the constant color approximation to the color image and the length of the boundaries between the regions, with a goal toward keeping the error and length as small as possible. Each pixel in the input (original) image is initially assigned to its own region; the regions are then merged. Each pair of neighboring regions is a candidate for merging; a pair is merged when its contribution to the objective function is smaller than that of any other pair. Merging continues until the total number of regions is less than or equal to the number requested. The boundaries of these regions are then written to a file. The boundaries are actually the edges between the pixels, so they include many short segments and "staircases." In the illustrated implementation described herein, the MegaWave2 color image segmentation module was modified to both accept more image formats and to write out the region boundaries in a more convenient form.

The output of the image segmentation performed by MegaWave2 produces a list of vertices that make up the polygonal arcs that form the region boundaries in the image. The edges specified by this output is somewhat simplified before it is provided as individual line segments to the insertion operation illustrated in FIGS. 15–18 to create the ISM representation of the original image. Simplification can be accomplished by any one of a number of methods. In one method, the output directly provided by the color image segmentation software is itself inserted into an ISM for purposes of refining it, prior to building the actual ISM representation of the input image. Rendering operation 440 (FIG. 2) of the present invention makes it possible to render an image of this preliminary image structure map data, from which it possible to detect small rectangular regions that are only a pixel high or wide. These regions are removed, and the line segments that remain are collected an arc at a time. An arc is a collection of line segments for which all interior vertices are of degree two (where the degree of the vertex is the number of line segments that end there) and the vertices at the two ends of the arc are not of degree two. Each arc is segmented into a smaller number of line segments by the method of recursive subdivision. This method finds the vertex that lies the greatest distance from the line through the arc's endpoints; if the distance is below a threshold (one pixel in this case), the output is a segment that has the arc's endpoints. Otherwise the arc is divided into two at that vertex, and each piece of the arc is segmented the same way. The output is an arc of line segments between the vertices at which a subdivision occurred. No vertex on the subdivided arc is further away from the original arc than the threshold. The subdivided arcs are the line segments used as input to the dynamic insertion operation described in FIGS. 15–18 that create the ISM. In another implementation, line segments are simplified using a shortest path algorithm.

2. The rounding operation and storing machine representable coordinate values for vertices.

The present invention performs a rounding operation to produce an ISM in which all vertices of image region boundaries (endpoints and intersections) have locations specified in machine representable numbers, referred to as rounded vertices, and computes intersections of a new image region boundary with existing image region boundaries using the original unrounded image region boundaries, not their rounded representations.

Preliminary to the discussion of the rounding operation, several definitions are useful. An "unrounded image region boundary," also referred to as an "unrounded line segment," and referred to herein in an abbreviated manner as an "ursegment," is an image region boundary that is input to the rounding operation and that may have the values of the coordinates of each of its endpoints in the plane specified as real numbers. An "unrounded vertex," including both endpoints and intersections of unrounded image region boundaries, has the values of the coordinates of its location in the plane specified as real numbers. A "rounding operation" is one or more operations that takes as input either an unrounded image region boundary or an unrounded vertex or both and produces a rounded vertex perturbed to an integral point that is determined by the operation(s). The rounding operation makes use of a conceptual Euclidean plane that is tiled into unit squares, each of which is referred to as a pixel. The plane is assigned coordinates so that pixel centers have integral coordinates; a pixel center is called an "integral point," or a "representable point." The pixels and integral points form a grid in the plane. A "hot pixel" is a unit square (pixel) in a grid of pixels that contains an unrounded vertex (i.e., either an ursegment endpoint or the intersection point of two ursegments.) A point having real coordinates on an image region boundary, such as an unrounded vertex, is said to be "perturbed to" or "rounded to" an integral point when the real coordinates of the point are replaced by integer coordinates; an unrounded vertex that is perturbed to an integral point is referred to as a "rounded vertex" or a "perturbed vertex." "To perturb" an unrounded vertex means to replace its real coordinates with integer coordinates.

A "polysegment" is the polygonal image region boundary that results when all of the vertices in an unrounded image region boundary (i.e., an ursegment) are perturbed to integral points. A polysegment includes one or more image region boundaries, each of which is called a "fragment." When the endpoints of an ursegment are the only points of the ursegment perturbed to integral points, the polysegment contains only one fragment. A point on an image region boundary having real coordinates that is not a vertex, referred to herein as a "nonvertex point", may also be perturbed to an integral point; perturbing a nonvertex point produces a rounded vertex in place of the point on the image region boundary.

Specifying vertices in this manner takes an input image region boundary and produces a "rounded region image boundary." An "unrounded partition of the original image" is a partition in which vertices are not guaranteed to be specified as machine representable points. An unrounded partition is also referred to herein as an "ideal partition of the original image." A rounded partition of an original image into image regions—one in which all vertices are rounded— is "topologically consistent" with an ideal partition of the original image when each rounded vertex retains the same orientation with respect to any particular rounded region boundary as the corresponding ideal vertex has with respect to its corresponding unrounded region boundary.

The rounding operation employed in the illustrated implementation of the present invention uses a set of rounding rules that are mathematically provable as producing a rounded partition that is topologically consistent with the partition of their original image region boundaries. These rounding rules are used during region boundary insertion operations to ensure that locations of vertices are stored in the ISM as representable points. The first rounding rule states that when a vertex occurs within the boundary of a grid square, called a "hot pixel," the vertex is perturbed to the integral point of the hot pixel. The second rounding rule states that when an unrounded image region boundary, referred to as an "ursegment," passes through a hot pixel, it is perturbed to pass through that pixel's integral point. Perturbing an image region boundary so that an intersection that lies on it is rounded to an integral point breaks up the original image region boundary into it's component fragments. The rules provide that a fragment is added to an ursegment only where a vertex of the partition lies on the segment, or where the ursegment passes "near" an integral point which will become a vertex of the rounded partition, where "near" is defined as being within the boundary of the hot pixel.

Figure 7:
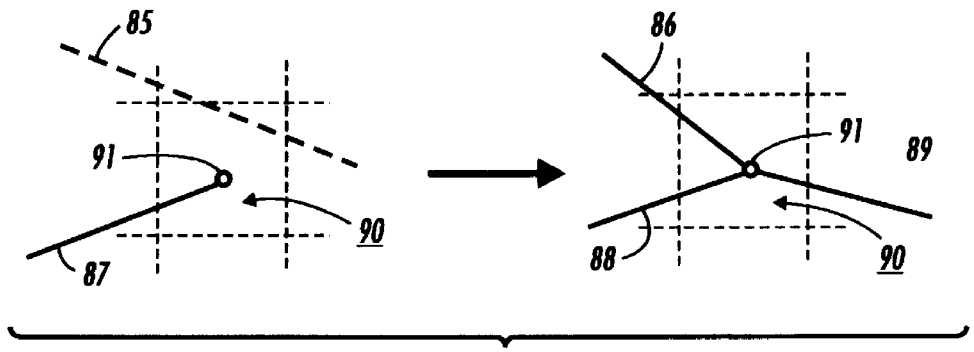
FIG. 7 illustrates the first of two rules used to represent vertices in the image structure map data structure as machine representable points according to the present invention.
Figure 8:
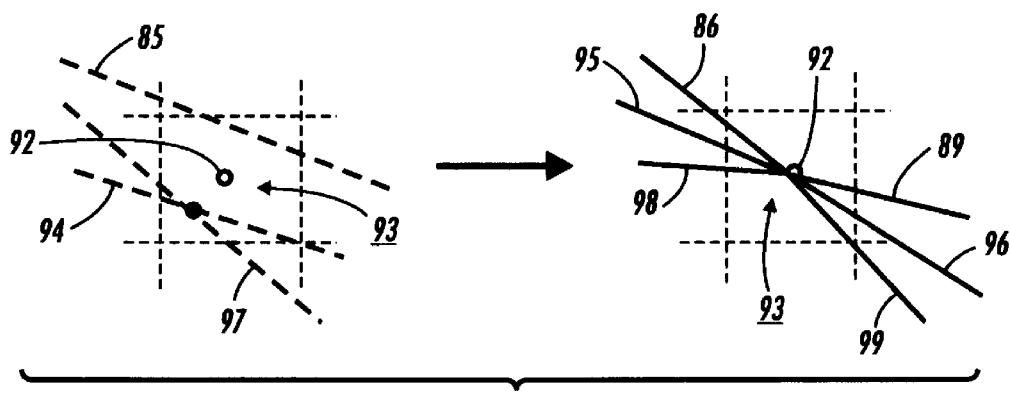
FIG. 8 illustrates the second of two rules used to represent vertices in the image structure map data structure as machine representable points according to the present invention.

FIGS. 7 and 8 illustrate the two rounding rules. With reference to FIG. 7, the left side of FIG. 7 shows two ursegments 85 and 87 in a portion of a plane that includes pixel 90; ursegment 87 terminates in pixel 90, such that pixel 90 includes a vertex (the endpoint), thus making pixel 90 a hot pixel; ursegment 85 passes through the hot pixel. The right side of FIG. 7 shows the result of applying the two rules. It can be seen that the first rule results in ursegment 87 being perturbed to integral point 91; ursegment 87 thus becomes perturbed segment 88. The second rule results in ursegment 85 being divided into two fragments 86 and 89 of what is now a polysegment; this is required in order to perturb ursegment 85 to integral point 91. Note that ursegment 87 may also be divided into two (or more) fragments, depending on whether the remaining portion of ursegment 87 not shown in FIG. 7 passes through one or more additional hot pixels; if only the endpoints of ursegment 87 are perturbed, the rounding operation produces a polysegment having only one fragment.

FIG. 8 illustrates the rounding rules applied to a hot pixel that contains an intersection of two ursegments and an ursegment that passes through a pixel containing an intersection. The left side of FIG. 8 shows three ursegments 85, 94 and 97 in a portion of the plane that includes pixel 93; the ursegments are distinguishable by the patterning used to draw them. Pixel 93 contains integral point 92. Ursegments 94 and 97 intersect in pixel 93, thus making pixel 93 a hot pixel; ursegment 85 passes through pixel 93. The right side of FIG. 8 shows the result of applying the rounding rules to ursegments 85, 94 and 97. As in FIG. 7, ursegment 85 is divided into two fragments, labeled 86 and 89, of what is now a polysegment. The vertex formed by the intersection of ursegments 94 and 97 is shown perturbed to integral point 92 on the right side of FIG. 8. This results in each ursegment being divided into fragments of a polysegment; ursegment 94 is divided into fragments 98 and 96, and ursegment 97 is divided into fragments 95 and 99.

When rounding is accomplished according to the set of rounding rules illustrated in FIGS. 7 and 8, several other topological properties of the rounded partition are also guaranteed: no fragments intersect except at their endpoints; if ursegment r intersects ursegment s and then ursegment t, then polysegment ρ cannot intersect polysegment τ before polysegment σ; and if a vertical line l through pixel centers intersects ursegment s and then ursegment t, then l cannot intersect polysegment τ before polysegment σ. The rounding operation ensures that image region boundaries are inserted into the image structure map data structure in a manner that is topologically consistent with the locations of the boundaries in the original image.

3. Image structure map data structures of an illustrated implementation of the invention.

The illustrated implementation of the present invention builds a partition data structure of the original image having the form of a vertical trapezoidal decomposition, also referred to as a vertical cell decomposition (VCD.) A "trapezoidal decomposition" as used herein is a partition of an original image in which the representation of each image region in the data structure is subdivided into areas, referred to as cells, each having a standardized geometric shape of a trapezoid, such that a data structure describing a cell requires a fixed amount of memory space. An "attachment" or "attachment boundary" is a special type of image boundary that is added to a location within an image region to divide the image region into one or more cells when the set of image region boundaries determined to form an image region has an irregular, nonstandard geometric shape. An "attachment boundary data item" is a data item included in the image structure map that represents an attachment. The cells in trapezoidal decompositions have at most four sides and may have three sides, in the case of a triangle which is considered to be a degenerate form of a trapezoid. As used herein, when a cell in a trapezoidal decomposition is referred to as having a "predetermined" number of sides, it is understood that the cell is a standard geometric shape having a fixed number of four sides, but includes degenerate shapes having three sides.

A "vertical trapezoidal decomposition of an original image" is a trapezoidal decomposition of the original image in which the regions are subdivided into one or more trapezoids having either two parallel vertical sides or at least one vertical side and a vertex. A vertically-oriented attachment boundary, called a "vertical attachment," is added to a location within an image region to divide the image region into one or more vertical cells.

While the image structure map produced according to the illustrated embodiment of the present invention has been implemented as a trapezoidal decomposition, partitions of an original image produced according to the present invention are intended to include partitions in which regions are subdivided into cells referred to in general as bounded complexity subregions having other standardized geometric shapes, such as triangles (producing partitions called triangulations), hexagons, and octagons. Because the ISM maintains a higher level region data structure which is used to produce the rendered image version of the original image, the particular shape used for representing a cell has no effect on the image regions that are seen by a viewer of the rendered image version. The representation of image regions in the image structure map as a collection of bounded complexity subregions has the advantage of providing a predictable level of efficiency for performing a search operation such that searching for an intersection location of a line segment with a side of an image region is performed in a fixed amount of time per cell searched for the intersection location.

Figure 9:
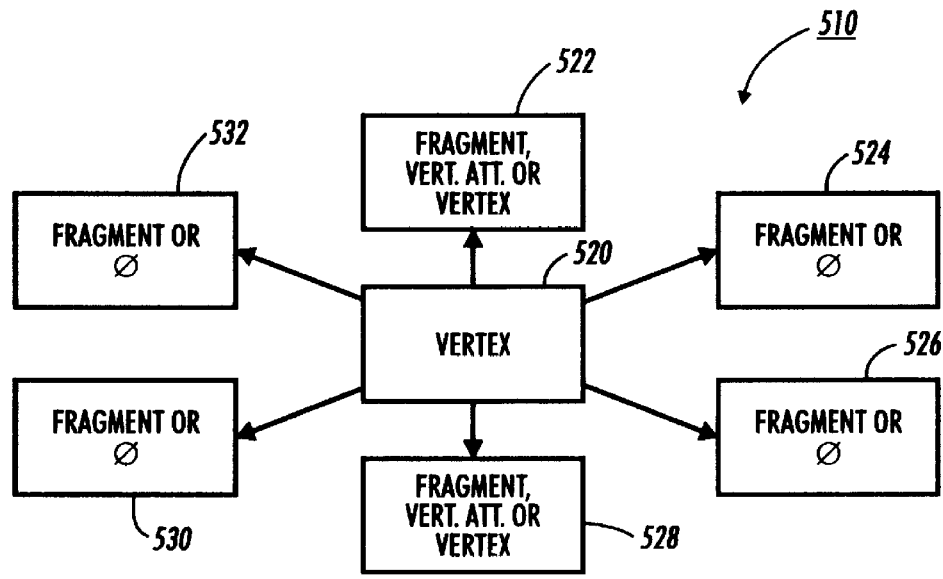
FIG. 9 schematically illustrates a vertex data structure that is part of the image structure map data structure representing the original image and produced according to an illustrated embodiment of the present invention.
Figure 10:
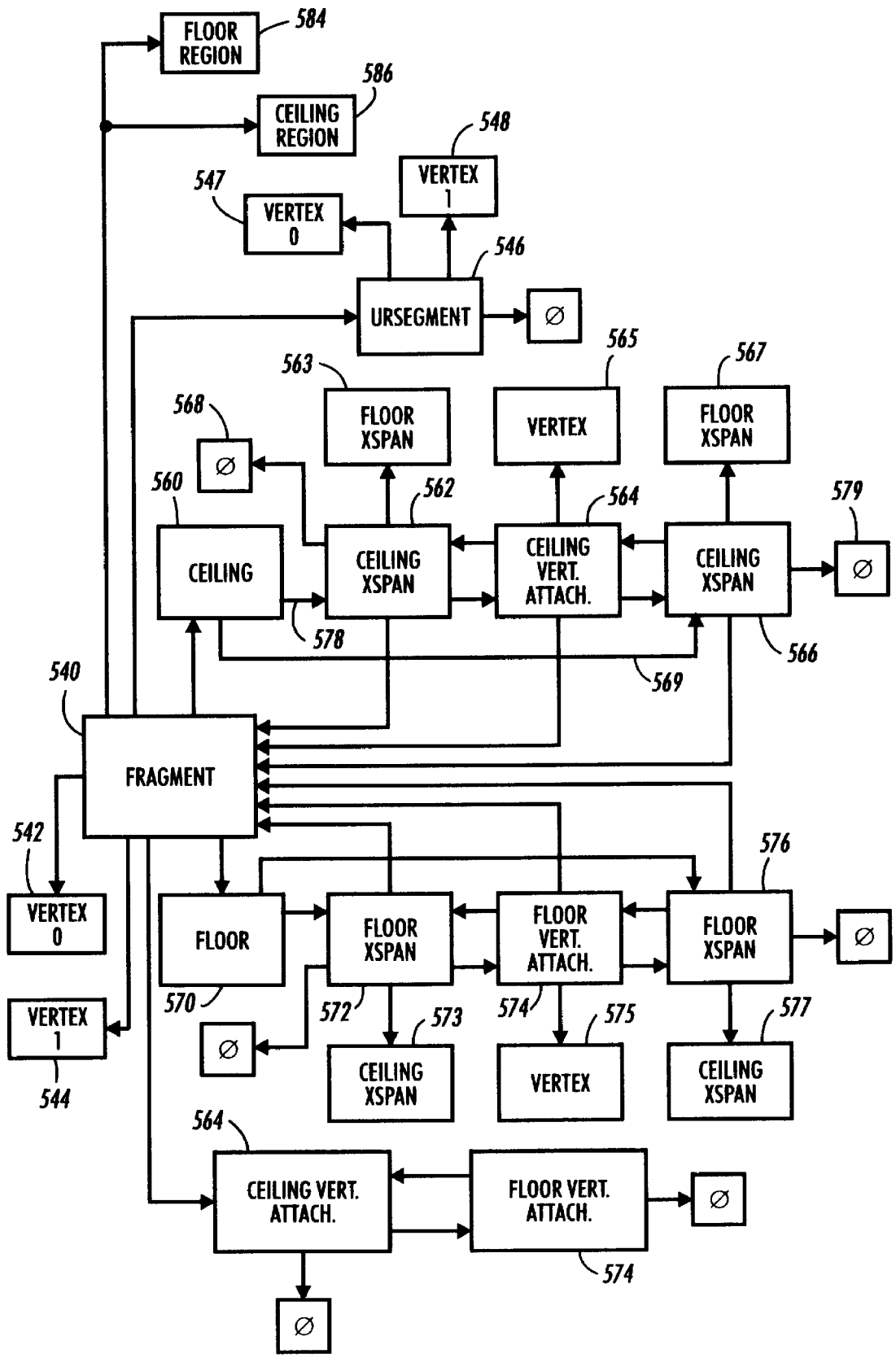
FIG. 10 schematically illustrates a representative fragment data structure that is part of the image structure map data structure representing the original image and produced according to the illustrated embodiment of the present invention.
Figure 11:
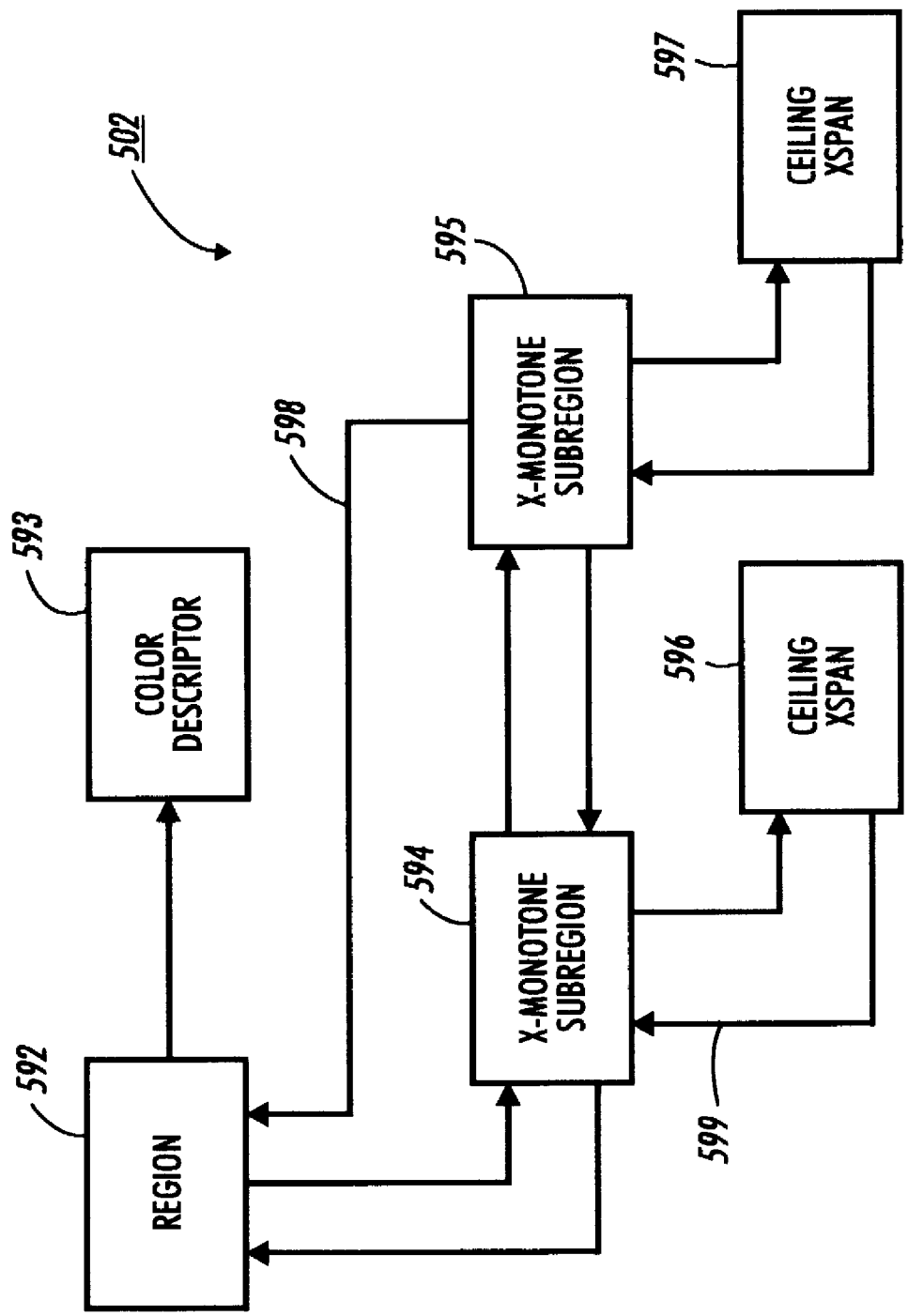
FIG. 11 schematically illustrates a representative region data structure that is part of the image structure map data structure representing the original image and produced according to the illustrated embodiment of the present invention.

FIGS. 9, 10 and 11 schematically illustrate three of the data structures that define an ISM in the form of a VCD produced according to the illustrated implementation of the present invention. Data items in the data structure are represented by labeled boxes in the figures. FIG. 9 shows the vertex data structure; each vertex in the original image is represented by a vertex data structure of the type shown in FIG. 9. FIG. 10 shows a representative fragment data structure for a nonvertical fragment; each of the nonvertical fragments that result from inserting and rounding an image region boundary from the original image is represented by a fragment data structure of the type shown in FIG. 10. FIG. 11 shows a representative region data structure for an image region in the original image; each region in the original image is represented by a region data structure of the type shown in FIG. 11. There is a third data structure, not shown in the figures, for representing information about a vertical attachment, and a separate data structure, also not shown for representing information about vertical fragments. The region, vertex, vertical and nonvertical fragment and vertical attachment data structures collectively represent the VCD of the original image that is built by the illustrated embodiment of the present invention.

The initial state of the ISM, prior to the insertion of the first region boundary, consists of a set of four boundary ursegments with integral endpoints arranged in a rectangular boundary that represents the rectangular extents of an input original image as it would be printed or displayed. Each of these boundary ursegments has one fragment. The entire image structure map data structure is accessed by a pointer to the left vertex of the bottom horizontal boundary ursegment.

Figure 12:
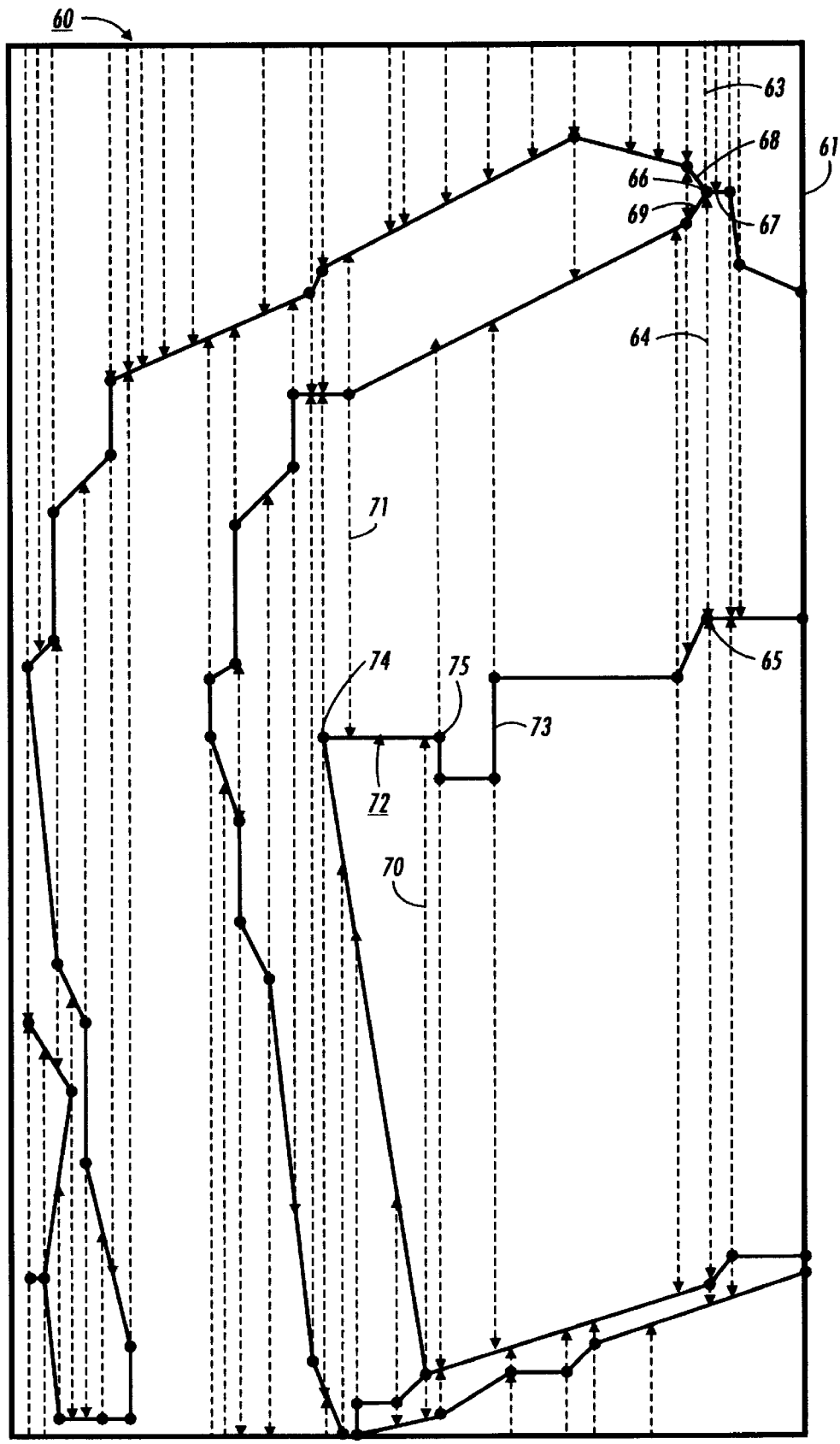
FIG. 12 is an image rendered from a portion of the image structure map data structure representation of a portion of the image of FIG. 3, showing the vertical cell decomposition produced according to the illustrated embodiment of the present invention.
Figure 13:
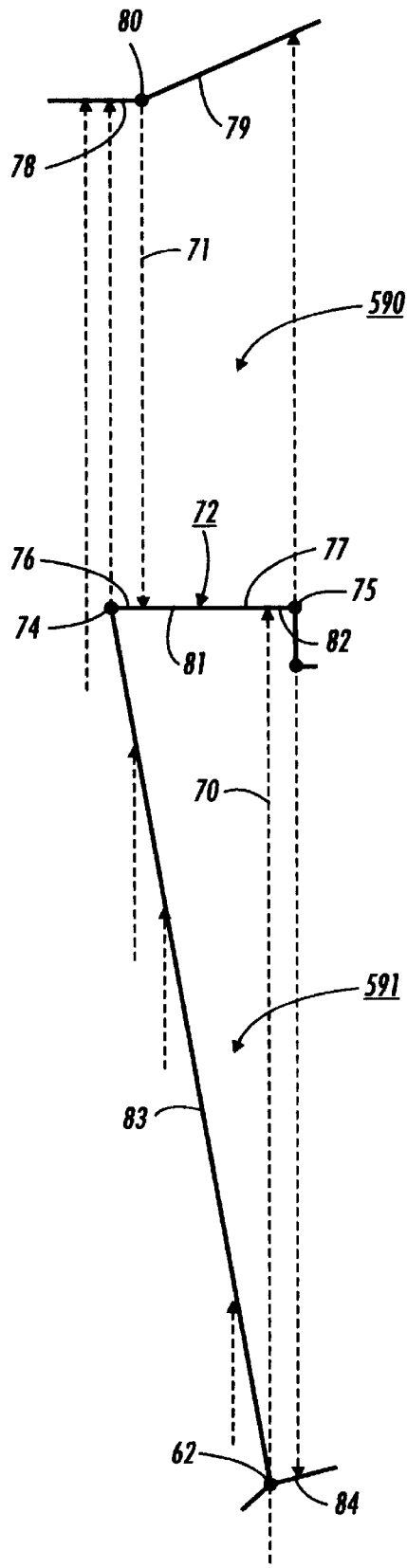
FIG. 13 is a portion of the vertical cell decomposition illustrated in FIG. 12, illustrating structures in the vertical cell decomposition that are included in the fragment data structure of FIG. 10.
Figure 14:
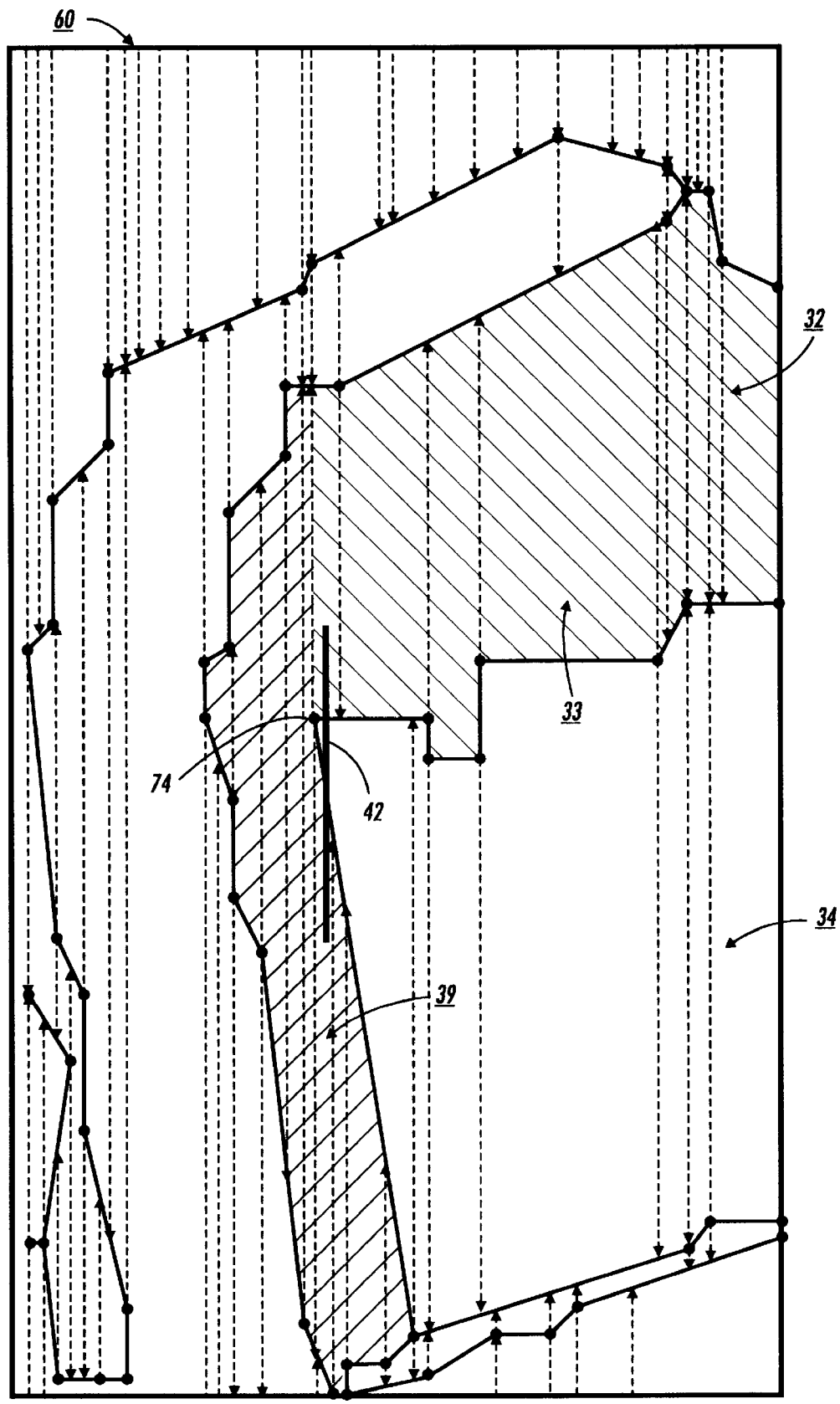
FIG. 14 is the rendered image of FIG. 12 illustrating the concept of an x-monotone subregion of an image region that is part of the region data structure illustrated in FIG. 11.

The description of the data structures shown in FIGS. 9, 10 and 11 makes reference to image structures shown in rendered image 60 of FIGS. 12 and 14, and to a portion of rendered image 60 shown in FIG. 13. Rendered image 60 presents a visual representation of the vertical cell decomposition of a portion of original image 2 (FIG. 3.) In rendered image 60, a vertex is represented by a filled circle and a region boundary by a solid line. Rendered image 60 shows vertical attachments as dashed lines with a single arrow at one end, for a single vertical attachment, and arrows at both ends for a double vertical attachment. Examples of single vertical attachments illustrated in FIGS. 12 and 13 include vertical attachments 70 and 71; an example of a double vertical attachment is identified by reference numeral 64 in FIG. 12. Note that the portion of vertical ursegment 61 shown in FIG. 12 forms a portion of the right vertical boundary of original image 2.

a. The vertex data structure.

With reference to FIG. 9, vertex data structure 510 includes vertex location 520 of a vertex in the original image. Vertex 520 includes pointers to all other structures in the VCD that are adjacent to vertex 520, as shown by the arrows that point to boxes 522, 524, 526, 528, 530 and 532. The vertex pointers in the illustrated embodiment are defined according to the geometry of the partition, such that box 522 points to a fragment, vertical attachment or another vertex that is positioned vertically above vertex 520 in the partition, while box 528 points to a fragment, vertical attachment or another vertex that is positioned vertically below vertex 520 in the partition. Note that a vertex points to a vertical attachment when that vertical attachment is directed away from the vertex, represented by the arrowheads at the end of the vertical attachments shown in FIG. 12. When vertices are vertically aligned, each has a vertical attachment directed to the other, which form a double vertical attachment. Each vertex of the pair of vertically aligned vertices points to the other vertex in box 522 or box 528.

Boxes 524, 526, 532 and 530 indicate fragments in the partition that are adjacent to vertex 520. Box 524 indicates the top-most fragment of all fragments positioned to the right of vertex 520, while box 532 contains the top-most fragment of all fragments positioned to the left of vertex 520 in the partition, referred to as the top right and top left fragments, respectively. Similarly, boxes 526 and 530 indicate the bottom-most fragments in the partition that are positioned to the right and left, respectively, of vertex 520 in the partition, called the bottom right and bottom left fragments. Note that these data items indicate the relationship only of the positions of these fragments with respect to vertex 520 and to each other, and do not indicate any information related to the direction or angle of a fragment in the partition. There may be other fragments adjacent to vertex 520 in between the top and bottom fragments pointed to by vertex 520. These other fragments are located using a portion of the fragment data structure called the floor and ceiling lists, described in more detail below, since the ceiling list of the bottom fragment points to structures on the floor list of a fragment located above the bottom fragment, and thus these intermediate fragments can be located. Note that if there is only one fragment located to the right or to the left of a vertex, both top and bottom fragments point to the same fragment. Analogously, if no fragment is present at the right or left of a vertex, both top and bottom pointers are empty.

With reference to FIG. 12, vertex data structure 510 representing vertex 66 in the top right corner of rendered image 60 contains the location of vertex 66 in box 520; box 522 indicates a pointer to vertical attachment 63 (the top of which is not visible in rendered image 60,) and boxes 524 and 526 indicate a pointer to fragment 67. Vertical attachment 64 in FIG. 12 illustrates a double vertical attachment, and so box 528 indicates a pointer to vertex 65. Box 530 indicates fragment 68, and box 530 indicates fragment 69.

b. The fragment data structure.

With reference to FIG. 10, the fragment data structure indicates information about each nonvertical fragment 540 in the image structure map. Fragment data structures of the type shown in FIG. 10 are examples of an implementation of region boundary data structure 508 in FIG. 4. Fragment 540 points to the endpoints of the fragment, shown as left vertex 542 (labeled Vertex 0) and right vertex 542 (labeled Vertex 1). Nonvertical fragments typically have a sequence of structures above and below them, which are represented with two doubly linked lists called the "ceiling" (for the structures above) and "floor" (for those below) lists of the fragment. In addition to facilitating vertical motion from a nonvertical fragment, the ceiling and floor lists make it easy to move horizontally along the fragment. Nonvertical fragments 67, 68 and 69 in the upper right corner of rendered image 60 of FIG. 12, and nonvertical fragment 72 in the center of rendered image 60 are examples of the type of nonvertical fragments that are represented by the fragment data structure shown in FIG. 10. Fragment 72 in particular is a representative fragment that is stored in the fragment data structure illustrated in FIG. 10. In order to illustrate the image structures associated with fragment 72 in more detail, a portion of rendered image 60 in FIG. 12 is reproduced in FIG. 13 and includes nonvertical fragment 72 extending from left vertex 74 to right vertex 75 and its associated structures.

A vertical attachment that is directed to a fragment defines a portion of the interval in x occupied by the fragment. This portion of the fragment in x is represented by a structure called an "xspan". When an xspan occurs as a structure above the fragment, it is called a "ceiling xspan;" similarly, when an xspan occurs as a structure below the fragment, it is called a "floor xspan." Each trapezoid in the VCD is bounded below by a ceiling xspan (belonging to the fragment at the bottom of the trapezoid) and above by a floor xspan (belonging to the fragment at the top of the trapezoid). For example, trapezoid 590 in FIG. 13 is bounded below by the second ceiling xspan 77 of fragment 72, and above by the first floor xspan 79 of the fragment that begins at vertex 80 and extends out of FIG. 13. The floor and ceiling xspans that bound a trapezoid point to each other, which makes it possible to move vertically across a trapezoid.

The locations of the xspan structures are stored in data structures referred to as ceiling lists and floor lists. FIG. 10 illustrates ceiling list 560 and floor list 570 of representative nonvertical fragment 540. Each of the ceiling and floor lists in a fragment data structure includes an xspan, followed by zero or more sequences of a vertical attachment followed by an xspan that divide the remainder of the fragment. Each of the ceiling list 560 and floor list 570 in the fragment data structure of FIG. 10 are illustrated to include an xspan 562 or 572, followed by one sequence of a vertical attachment 564 or 574 followed by an xspan 566 and 576. The doubly-linked structure of the ceiling and floor lists is illustrated in the ceiling list by arrows 578 and 569, pointing to the head and tail of the lists, respectively, and by empty list items 568 and 579 at the end of each list path. Ceiling xspan 562 bounds the bottom of a trapezoid in the VCD and points to the floor xspan 563 that bounds the top of that trapezoid. Ceiling vertical attachment 564 points to the vertex data structure 565 from which ceiling vertical attachment 564 extends. Floor list 570 is organized in an analogous manner.

FIG. 13 in conjunction with FIG. 10 shows fragment 72 in more detail, and illustrates with a specific example the data contained in the ceiling list 560 and floor list 570 (FIG. 10) of a fragment. The structures on the top, or ceiling, of fragment 72 in FIG. 13 include ceiling xspan 76, followed by ceiling vertical attachment 71, followed by ceiling xspan 77. In the fragment data structure 540 of FIG. 10 for fragment 72, ceiling list 560 will include these structures as ceiling xspan 562, ceiling vertical attachment 564, and ceiling xspan 566, respectively. In addition, in FIG. 13 it can be seen that the structure opposite and above ceiling xspan 76 is floor xspan 78; ceiling vertical attachment 71 extends down from vertex 80; and the image structure opposite and above second ceiling xspan 77 is floor xspan 79. Ceiling list 560 in the fragment data structure 540 of FIG. 10 for fragment 72 will also include these image structures as floor xspan 563, vertex 565 and floor xspan 567, respectively, such that ceiling xspan 76 points to floor xspan 78, ceiling vertical attachment 71 points to vertex 80, and second ceiling xspan 77 points to floor xspan 79.

Similarly, the floor list 570 of fragment 72 in FIG. 13 is constructed in an analogous manner using the structures shown on the bottom, or floor, of fragment 72. These structures include floor xspan 81, followed by floor vertical attachment 70, followed by floor xspan 82. In the fragment data structure 540 of FIG. 10 for fragment 72, floor list 570 will include these image structures as floor xspan 572, floor vertical attachment 574, and floor xspan 576, respectively. In addition, in FIG. 13 it can be seen that the image structure opposite and below floor xspan 81 is ceiling xspan 83; floor vertical attachment 70 extends up from vertex 62; and the image structure opposite and below second floor xspan 82 is ceiling xspan 84. Floor list 570 in the fragment data structure 540 of FIG. 10 for fragment 72 will also include these structures as ceiling xspan 573, vertex 575 and ceiling xspan 577, respectively, so that floor xspan 81 points to ceiling xspan 83, floor vertical attachment 70 points to vertex 62, and floor xspan 82 points to ceiling xspan 84. Note that ceiling xspan 83 is actually a complete fragment since cell 591 bounded by fragments 72 and 83 and vertical attachment 70 has the shape of a triangle and has only one vertical side.

In order to locate regions quickly from a fragment data structure, fragment data structure 540 in FIG. 10 also points to the regions above and below the fragment, in floor region pointer 584 and in ceiling region pointer 586. In the case of fragment 72 in FIGS. 12 and 13, it can be seen from FIG. 14 that fragment 72 is an image region boundary between region 32 above and region 34 below.

Two other linked lists are maintained with each fragment in the fragment data structure: a vertical attachment list and an ursegment list. To cross from the floor of a nonvertical fragment to its ceiling (or vice versa), fragment 540 points to a doubly linked list consisting of all vertical attachments on the floor and ceiling lists. In FIG. 10, a representative vertical attachment list shows ceiling vertical attachment 564 and floor vertical attachment 574 on this list; these correspond to vertical attachments 71 and 70 in FIG. 13.

Because rounding can cause two or more ursegments to share the same fragment, each fragment may be part of more than one ursegment; each fragment maintains a list of ursegments that it represents. Extensive experimentation has shown that these lists rarely have more than five ursegments. An ursegment points to the vertices at its endpoints. Fragment 67 in FIG. 12 may be an example of a fragment that belongs to two original image region boundaries.

c. The region data structure.

FIG. 11 illustrates region data structure 502 of the illustrated implementation of image structure map data structure 500 (FIG. 4) of the present invention. Region structure 592 points to color descriptor 593, which is the signal property descriptor for a region in the illustrated implementation. As described in more detail below, a color descriptor is either a single color, representing a constant fill color for the region when the image is rendered from the ISM, or the color descriptor is a 3x3 matrix of parameters, which produces a color that linearly varies in intensity within the region. Region structure 592 points to a list of structures called x-monotone subregions. FIG. 11 shows region structure 592 pointing to two x-monotone subregions 594 and 595. Each x-monotone subregion points to its containing region, as illustrated in FIG. 11 by arrow 598, and to a list of ceiling xspans, ordered by ascending x-coordinate, which represent the bottom xspans of the cells in the subregion. FIG. 11 shows each x-monotone subregion 594 and 595 pointing to a single ceiling xspan 596 and 597, respectively. Each xspan in turn has a pointer to the subregion that contains it, as illustrated by arrow 599.

Each x-monotone subregion has the property that any intersection of the subregion with a vertical line is a single vertical line segment, or the empty set. The x-monotone subregions divide the region, and each subregion's cells divide the subregion, so the union of cells in all of a region's subregions divides the region. FIG. 14 illustrates the concept of an x-monotone subregion. FIG. 14 illustrates rendered image 60 (first shown in FIG. 12) with image region 32 shown in heavy outline and with two types of cross-hatching. Region 32 surrounds region 34 above and to the left. Region 32 is an example of an image region with two x-monotone subregions. It can be seen that the intersection of vertical line 42 with the region 32 results in two line segments, and so the intersection is neither a single vertical line segment, nor the empty set. This means that region 32 cannot be a single x-monotone subregion, and must be divided. At all x positions at or to the left of vertex 74, and at all x positions to the right of vertex 74, the intersection of vertical line 42 with the respective portion of region 32 is a single vertical line segment, and thus vertex 74 and its associated vertical attachment marks the dividing line between the two subregions 33 and 39, which are shown with different diagonal cross-hatching patters in order to differentiate these subregions from one another in the figure.

d. Other data structures.

The two data structures not shown, the vertical attachment data structure and the vertical fragment data structure, are organized as follows. A vertical attachment data structure, such as ceiling vertical attachment 564 of FIG. 10, indicates its originating vertex, whether it is a ceiling or a floor vertical attachment, and the fragment with which it is associated. A vertical fragment data structure, indicates its vertices and a list of the ursegments that it represents. Fragment 73 in the center of rendered image 60 of in FIG. 12 would be represented in the ISM by a vertical fragment data structure.

4. Producing an image structure map according to the illustrated implementation.

The discussion now turns to a description of operation 300 of FIG. 2 to build an image structure map representation of an original image according to the illustrated implementation, using the image structure map data structure illustrated in FIGS. 9, 10 and 11. The image structure map data structure produced by the present invention is designed to support dynamic, incremental creation of the image representation from an original image. When image structure map 500 (FIG. 4) is initially created, it is initially defined as having a single region with a default or empty signal property descriptor. The single image region is bounded by four image region boundaries forming a rectangular border-like structure analogous to a picture frame. The ISM is constructed incrementally by inserting image region boundaries into the single image region. An important aspect of this dynamic data structure creation is that region boundary data may be added to, or deleted from, image structure map 500 without needing to know all of the region boundary data items that are to be included in the data structure a priori.

The functions of operation 300 for inserting an input image region boundary into the current ISM broadly include: locating existing unrounded image region boundaries that intersect with the input image region boundary, and identifying intersection locations; performing the rounding operation illustrated in FIGS. 7 and 8 on intersection locations and endpoints of the image region boundary being inserted; adding new vertex, fragment and region data structures as necessary to the ISM to represent the new image region boundary; and storing the original unrounded image region boundary in the ISM so that it is available for determining intersection locations with subsequently inserted image region boundaries.

The implementation of image region boundary insertion operation 300 is shown in the flowcharts of FIGS. 15, 16, 17 and 18. The description of some of these operations reference an image structure map hierarchy and a point location operation 400. The illustrated embodiment of the image structure map of the present invention produces a hierarchy of vertical cell decompositions of the image, where the lowest level (level zero) contains all the ursegments, and each successively higher level contains a subset of the ursegments present one level down. Locating points in the ISM, such as, for example, locating the intersection point of an input image region boundary with an existing unrounded image region boundary, makes use of an operation called point location, which is illustrated in the flowcharts shown in FIGS. 19 and 20. The organization of the ISM hierarchy and point location operation 400 are discussed in more detail below, following the discussion of the operations illustrated in FIGS. 15,16, 17 and 18.

a. Inserting ursegments in the image structure map.

Figure 15:
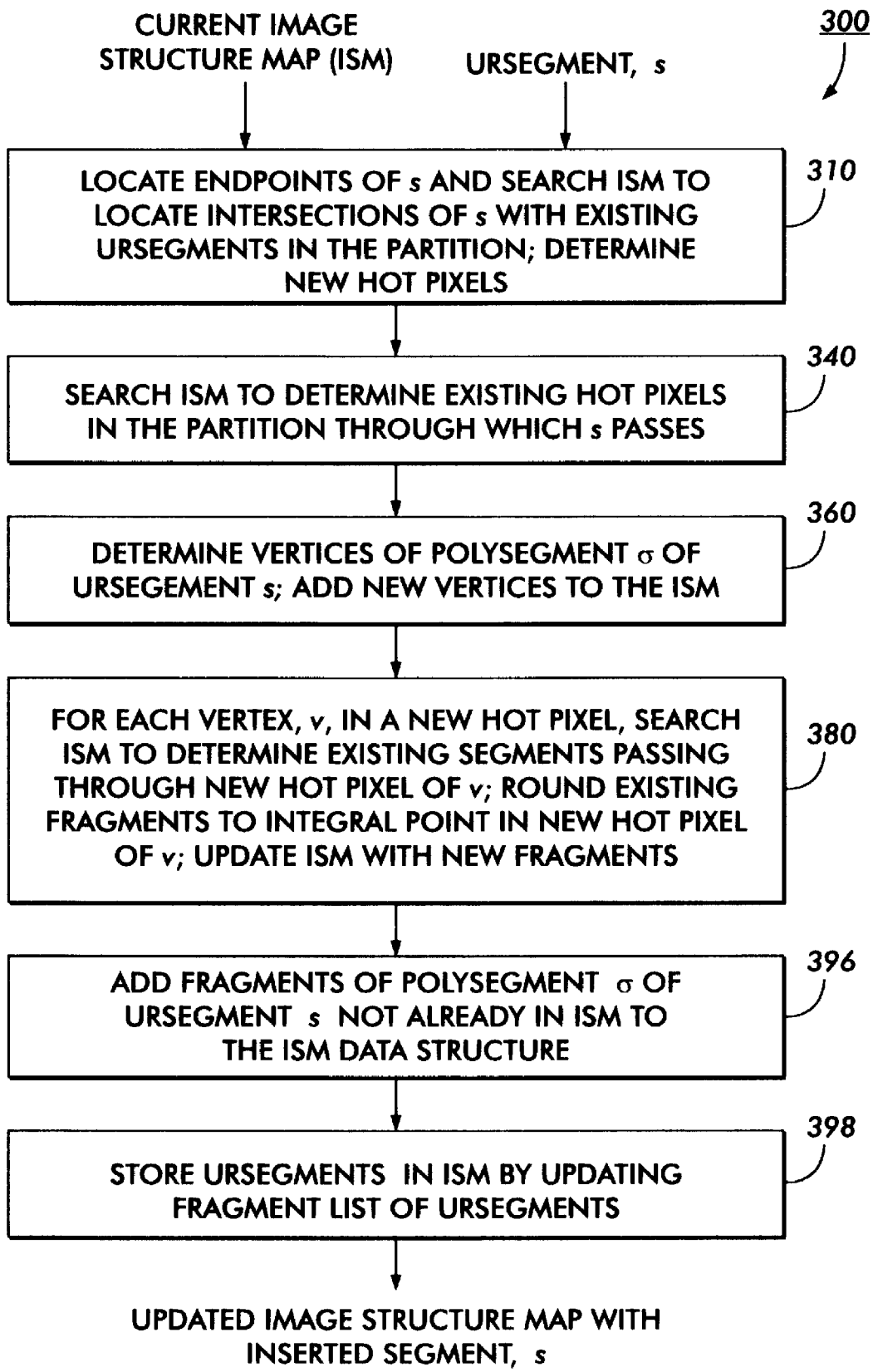
FIG. 15 is a flowchart illustrating the operation of inserting an image region boundary into the image structure map according to the illustrated embodiment of the present invention.

FIG. 15 illustrates operation 300 for inserting an unrounded line segment s into the image structure map data structure according to the illustrated embodiment of the present invention. Operation 300 involves two general concepts: first, the polysegment, σ, of s and all of its fragments must be determined so that fragment data structures of the type illustrated in FIG. 10 can be inserted into the image structure map data structure. Secondly, the insertion of s creates new hot pixels through which pass existing ursegments stored in the ISM; to complete the insertion of s according to the rounding operation rules of the illustrated embodiment, these existing ursegments must be rounded to the integral points of the respective new hot pixels through which they pass.

The illustrated embodiment of the present invention uses three different searches in the image structure map data structure to accomplish insertion. Two of these searches, in boxes 310 and 340 of FIG. 15, locate the new and existing hot pixels that new ursegment s passes through. Ursegment s is rounded to the integral points of these new and existing hot pixels, creating vertices on s. The polysegment σ of s is defined by the vertices of the new and existing hot pixels found in these two searches. Once the vertices of σ are known, they are added to the ISM, in box 360.

Existing ursegments may pass through the new hot pixels created by inserting ursegment s into the ISM data structure. For each vertex, v, of a new hot pixel, the search in box 380 locates the existing ursegments that pass through v's new hot pixel and perturbs the fragments of these ursegments to the integral point of the new hot pixel of v. The new fragments that result from this rounding are identified and new fragment data structures for the new fragments are added to the ISM. For a fragment that is already in the ISM data structure, only the ursegment it represents is required to be add to the existing fragment's list of ursegments.

Then, in box 396, those fragments of the polysegment σ of s not already in the ISM are added to the ISM, in box 396. These new fragment data structures have the new ursegment s as the only member of the fragment's list of ursegments. By the topological consistency properties of the rounding operation of the illustrated embodiment, these fragments intersect no others, which makes the insertion straightforward. For a fragment of σ that is already in the image structure map data structure, only the new ursegment is required to be add to the existing fragment's list of ursegments. Storing ursegments in the ISM, in box 398, simply requires adding the ursegment to the appropriate fragment's list of ursegments.

Figure 16:
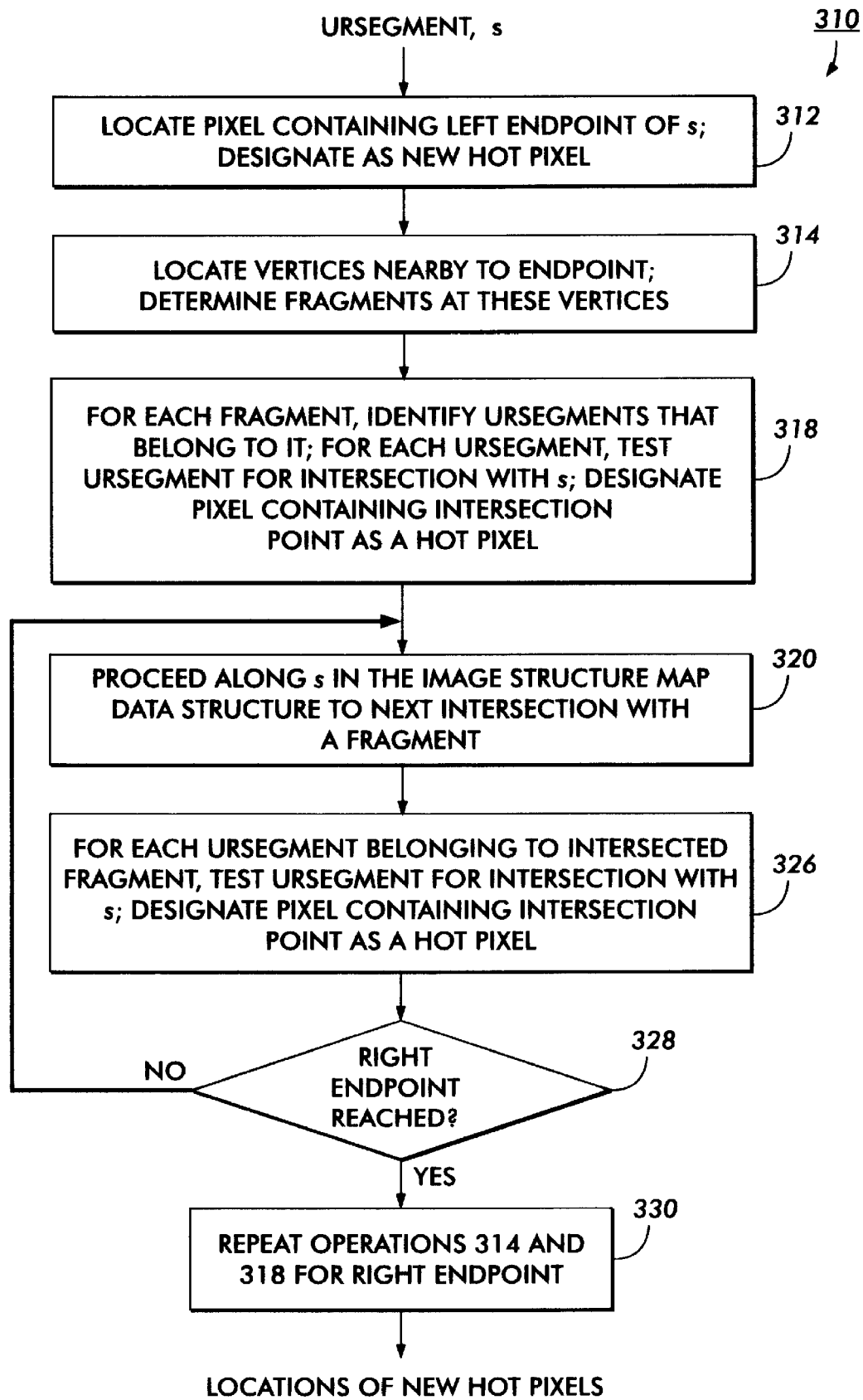
FIG. 16 is a flowchart illustrating one of the searches of the image structure map data structure illustrated in FIG. 15 to locate new hot pixels created by a newly inserted region boundary, according to the illustrated embodiment of the present invention.
Figure 17:
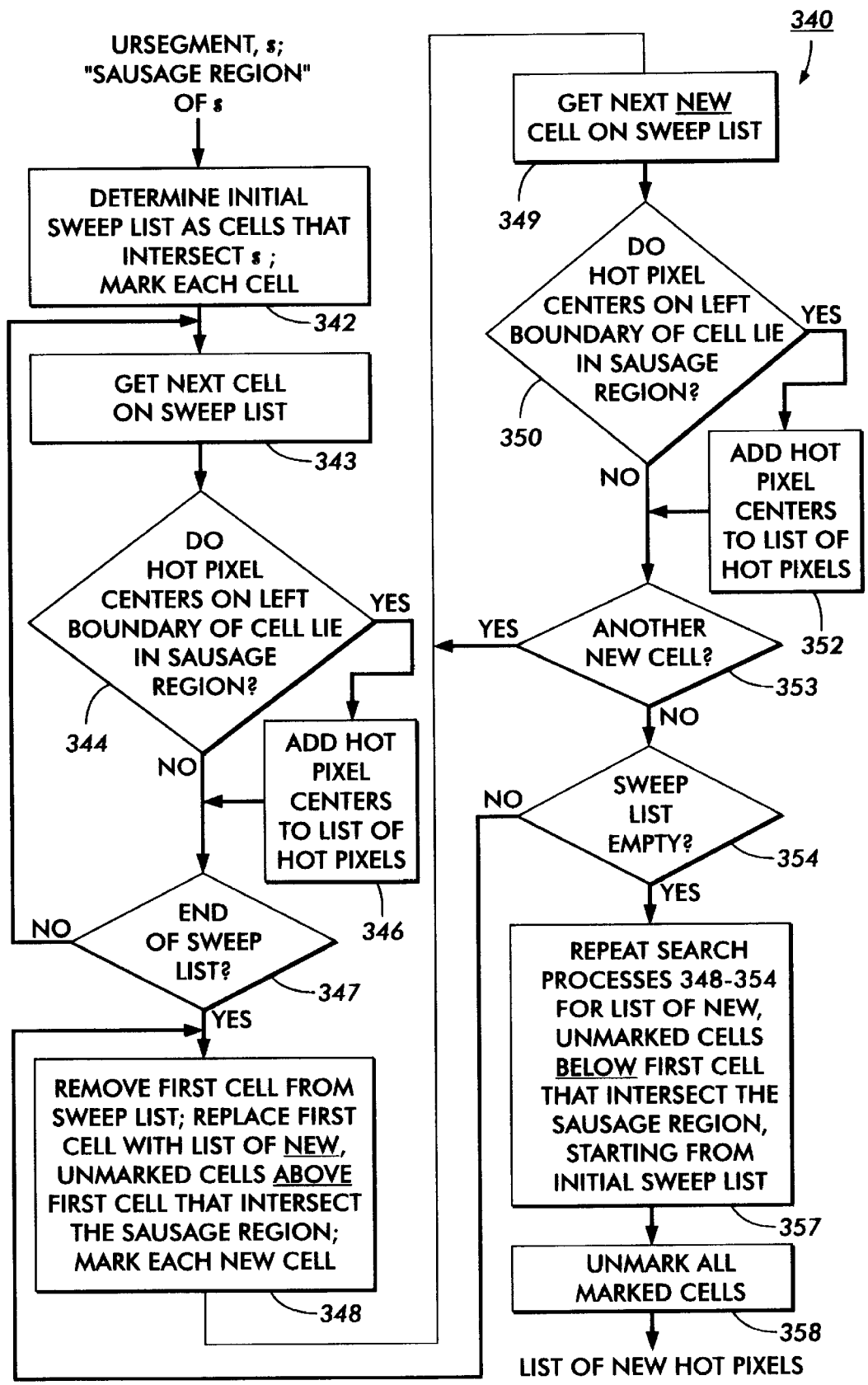
FIG. 17 is a flowchart illustrating another one of the searches of the image structure map data structure illustrated in FIG. 15 to locate existing hot pixels through which a newly inserted region boundary passes, according to the illustrated embodiment of the present invention.
Figure 18:
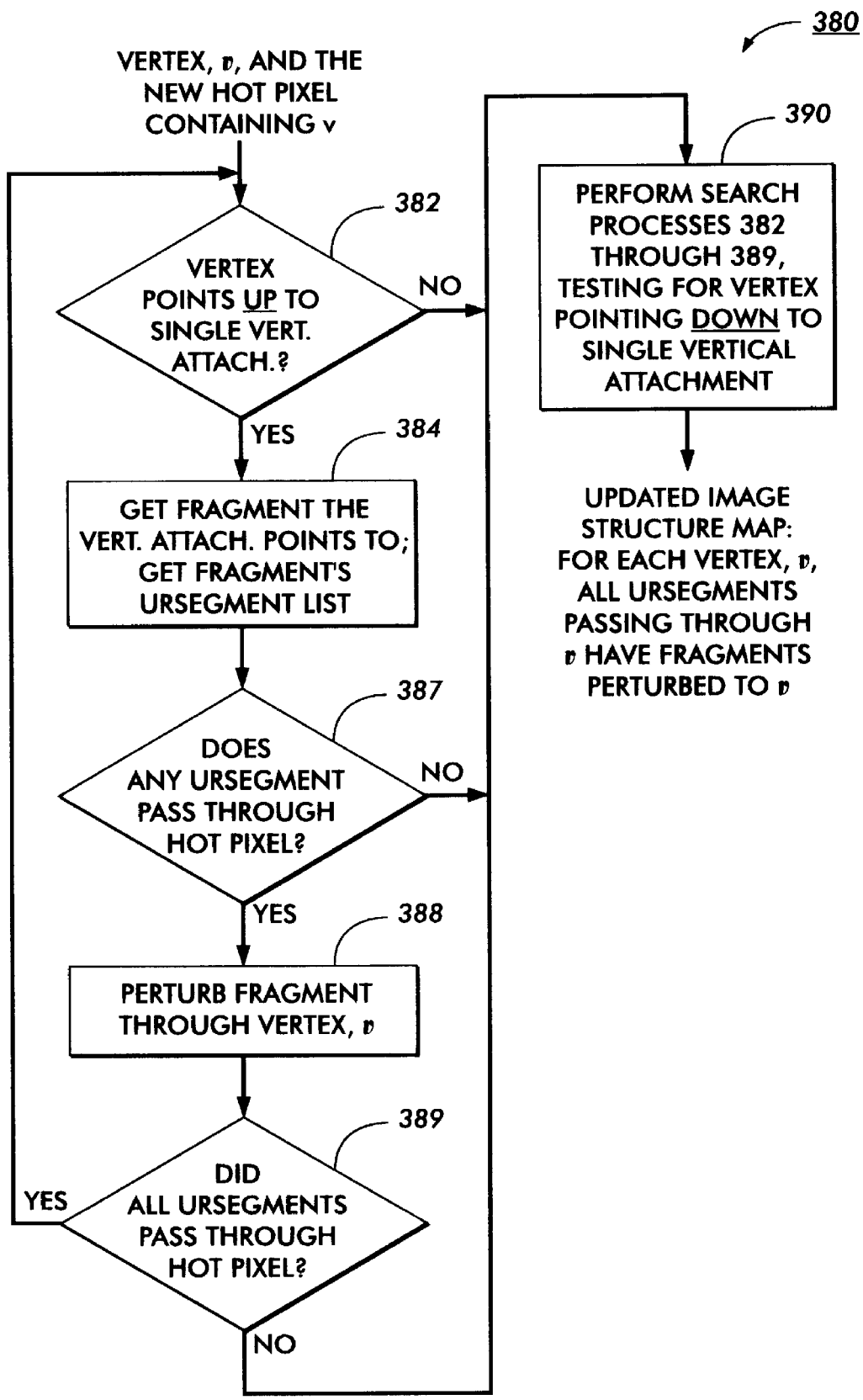
FIG. 18 is a flowchart illustrating a third search process shown in FIG. 15 through the image structure map data structure to find existing region boundaries that pass through new hot pixels, according to an illustrated embodiment of the present invention.

Each of these searches, which are illustrated in FIGS. 16–18 are now discussed in turn . . .

i. Image structure map traversal for locating the ursegments that intersect new ursegment s.

With reference now to FIG. 16, search 310, called "VCD traversal," produces a list of the locations of the new hot pixels in the ISM that result from the endpoints of s and from the ursegments that intersect s. The VCD traversal starts in the ISM at the location of the left endpoint of s, in box 312. This pixel is designate as a new hot pixel. Then, the vertices near the left endpoint are located, and the fragments near each of these vertices are determined, in box 314. For each fragment, the ursegments that belong to it are identified, in box 318; for each ursegment identified, the ursegment is tested for an intersection with s, and each pixel containing an intersection is designated as a new hot pixel. Next, s is followed through the image structure map data structure to its next intersection with a fragment, in box 320. When s intersects a fragment, each ursegment belonging to the intersected fragment is tested, in box 326, for an intersection with s, and the pixel containing the intersection point is designated as a new hot pixel. A test is then made in box 328 to see if the right endpoint of the new ursegment has been reached. If it has not, the VCD traversal continues to the next intersection of s with a fragment, in box 320. If the right endpoint has been reached, the pixel containing the right endpoint is designated as a new hot pixel, and the endpoint operations in boxes 314 and 318 are repeated, in box 330. The new hot pixels are those containing the endpoints of s and its intersections with existing ursegments.

ii. The cell sweep search.

The operations of the second of the three searches, referred to as the "cell sweep search," are illustrated in FIG. 17; search 340 locates existing hot pixels through which s passes. First, a small region surrounding the length of ursegment s is defined as a search area; if an existing hot pixel is within this search area, the new ursegment s being inserted is required to be rounded to the integral point of that hot pixel by the rounding scheme. This search area is referred to as the "sausage region" of s, and is defined to be the Minkowski sum of s with a pixel centered at the origin. Search 340 is based on the following premises: If s passes through a hot pixel, the vertex at the pixel's center must lie in the sausage region of s. If a cell intersects the sausage region, the vertices contained in the cell may lie inside the sausage region. To find the hot pixels through which s passes, therefore, each cell that intersects the sausage region must be tested to determine whether the vertices that lie on the cell boundary are inside the sausage region. The search is carried out in the upward direction to the top of the sausage region, and then in the downward direction to the bottom of the sausage region.

With reference now to FIG. 17, the input to the cell sweep search 340 is the new ursegment s being inserted, and the sausage region of s. First, the cells that intersect s are determined, in box 342; these cells make up the initial sweep list, and each cell on this initial sweep list is marked to show that it has been searched. For the next cell on the sweep list (this is the first cell the first time through) obtained in box 343, the cell is tested, in box 344, to determine whether the hot pixel centers on the left boundary of the cell lies in the sausage region. If so, the hot pixel centers is added to the list of existing hot pixels through which s passes, in box 346, and control passes to the test in box 347. If the hot pixel centers on the left boundary of the cell does not lie in the sausage region, a test is made, in box 347, to determine whether the end of the initial sweep list has been reached. If not, control passes to box 343 to get the next cell on the sweep list; each cell on the initial sweep list is processed in the same manner, in boxes 344, 346 and 347 until the end of the initial sweep list is reached.

Next, in box 348, the upward part of the cell sweep begins; the first cell is removed from the sweep list, and replaced with a list of new, unmarked cells that lie vertically above the first cell and that intersect with the sausage region. If this first cell is called cell i, then for cell j to be above cell i, part of cell j's bottom boundary must coincide with part of cell i's top boundary. Note, however, that cells that are completely outside the sausage region are excluded from the sweep list. Note also that if there are no new cells to be added to the sweep list because none meet the criteria for adding, then the cell that is now the current first cell on the sweep list is removed and replaced with a list of new, unmarked cells that lie vertically above this current first cell and that intersect with the sausage region; thus, the cell sweep, in addition to sweeping up and down, is sweeping horizontally, along the ursegment s until all the cells that intersect s are processed.

Also in box 348, each of the new cells just added to the sweep list is marked. Then the cell testing operations are made, in boxes 349, 350, 352 and 353 until all of these new cells have been tested. When all of these new cells have been tested, a test is made in box 354 to determine if the sweep list is empty. If not, control returns to box 348, when the current first cell on the sweep list is removed, and replaced with a list of new, unmarked cells above the first cell that intersect with the sausage region, and this new set of cells is tested in the same manner. Thus, first cells are removed and replaced with cells above, if there are any, until the sweep list is empty.

Then, the downward part of the cell sweep begins, in box 357; it is entirely analogous to the upward cell sweep. At the conclusion of the downward cell sweep, marked cells are all unmarked, in box 358, and the list of hot pixels found in the search is returned. These are the existing hot pixels through which s passes, and, together with the new hot pixels that contain the vertices of the endpoints and intersections of s, they are used to determine the polysegment σ of s. The cost of the cell sweep is proportional to the number of cells that intersect the sausage region of s.

iii. The image structure map range search.

The VCD traversal search 310 (FIG. 16) produces a list of all of the vertices in the new hot pixels of s. These vertices may be conveniently used to find existing ursegments that pass through each new hot pixel. The search to find these existing ursegments is called a "vertical range search" and is illustrated in the flowchart of FIG. 18 as search 380. Search 380 takes as input a vertex v of a new hot pixel of s, and thus is repeated for each such new vertex. Search 380 is also divided into an upward and downward search in the ISM. For the upward search, the input vertex v is tested, in box 382, to determine whether it points up to a single vertical attachment. If not, the upward portion of the search is complete, and control passes to the downward search, in box 390. If vertex v does point up to a single vertical attachment, the fragment that the vertical attachment points to is obtained, in box 384, and the ursegment list pointed to by that fragment is obtained.

The ursegments on the fragment's list are then tested, in box 387, to determine whether any one of the ursegments passes through the hot pixel of v. If any one does, the ursegment's fragment is perturbed to pass through v. Note that one of the consequences of perturbing this fragment is, of course, to divide it into two fragments; another consequence is that the vertical attachment that pointed to that fragment collapses, and there is now a vertical attachment extending up from the new vertex to the fragment above the one that was just perturbed. The ursegments for the fragment being tested is checked, in box 389, to see if all ursegments passed through the hot pixel. If so, this means that there is a new vertical attachment that may point up to another fragment that passes through the hot pixel of v; thus, control passes back to the text in box 382 to determine if there is such a vertical attachment. If at least one of the ursegments on the fragment list did not pass through the hot pixel of v, the upward search is complete, and control passes to the downward search, in box 390.

When it is determined, in box 387, that none of ursegments of the fragment being tested pass through the hot pixel of v, the upward search is complete, and control thus transfers to the downward search, in box 390.

Downward search 390 is completely analogous to the upward search illustrated in boxes 382 through 389 in FIG. 18. Completion of the upward and downward searches for existing ursegments that pass through a new hot pixels of a vertex v of s produces an updated ISM where the existing ursegments found have fragments rounded to v.

b. Locating points such as image region boundary vertices and intersections in the image structure map efficiently.

The image structure map representation of an original image includes an auxiliary data structure that facilitates point location. Support for an efficient point location operation is fundamental to image region boundary insertion, which requires an efficient mechanism for tracking, through the image structures in the image structure map, the location of an image region boundary that is to be inserted.

i. The data structure hierarchy.

Point location is facilitated by a hierarchy of vertical cell decompositions (VCDs) of the image, where the lowest level (level zero) VCD represents the most detailed level and contains all ursegments determined to be included in the original image, thus representing the complete partition of the original image, including the highest level region data structures of the type shown in FIG. 11. Each successively higher level VCD contains a subset of the ursegments that are present one level down. Adjacent levels are linked through their hot pixels and ursegments; each hot pixel or ursegment at level i has a "descent" pointer down to the corresponding hot pixel or ursegment at level i-1. Hot pixels and ursegments are the structures chosen to link VCDs at adjacent levels because, unlike either fragments or vertical attachments, hot pixels and ursegments form a strict hierarchy: once a hot pixel or ursegment appears at a level, it must appear at all lower levels. The entire hierarchy is accessed by a single pointer to the left vertex of the bottom horizontal ursegment in the top level of the hierarchy. Note that region data structures need not be represented at higher levels of the hierarchy, and are not represented at those levels in the illustrated embodiment.

The hierarchy of VCDs is randomized in the sense that the number of levels of the hierarchy in which a given ursegment appears is determined randomly. That is, each ursegment appears in the bottom N levels of the hierarchy, where N is computed by simulating tossing a coin until the coin comes up tails; N is the number of coin tosses required. As a consequence, the expected number of ursegments at each level is twice that of the next higher level. The highest level typically contains only a few ursegments.

Alternative methods for determining the number of levels at which an ursegment appears could take into account the ursegment's length, position, proximity to existing ursegments, or other aspects of the distribution of existing ursegments in the hierarchy of VCDs. The point of taking into account these other factors would be to increase the efficiency of the algorithm for point location, which uses the hierarchy. These alternative methods could be completely deterministic, or could have have a random component in addition to the other factors.

A new ursegment is inserted into the l bottom-most levels of the hierarchy, where l is computed independently for each ursegment and equals the number of trials of flipping a coin until tails is obtained. To insert the ursegment, an endpoint of the ursegment is located at all levels of the hierarchy as above, and then the ursegment at the bottom-most l levels is independently inserted using insertion operation 300 of FIG. 15. At each level, the descent pointers of the ursegment and of any new vertices created by the insertion are linked to the corresponding ursegments and vertices one level down.

There are two key properties of the ISM data structure hierarchy that make it an effective mechanism for supporting efficient point location. First, structures at successive levels are spatially closely related in a strong local sense. This means that once an image structure containing a given location is known at some level, an image structure containing the same given location can easily be located at the next finer level partition by at most a bounded local search in that next finer level. Secondly, the storage required by any given level of the hierarchy is smaller by some factor as compared to the next finer level. This second property guarantees both that the overall space needed by the hierarchy is comparable to the size of the most detailed partition, and that the hierarchy is shallow, i.e., it has a number of levels which is roughly logarithmic in the size of the full resolution structure. Point location, as will be seen from the description following below, is done by tracing a point through this hierarchy by starting at the coarsest level and proceeding successively to locate the same point at each finer level. The cost of going from one level to the next is small, because of the first property of the hierarchy structure. Since the second property of the hierarchy structure implies that the number of levels is only logarithmic, the search for the correct image structure will terminate quickly. This means that once an image structure containing a given location is known at some level, an image structure containing the same given location can easily be located at the next finer level partition by at most a bounded local search in that next finer level.

ii. The point location operation.

Figure 19:
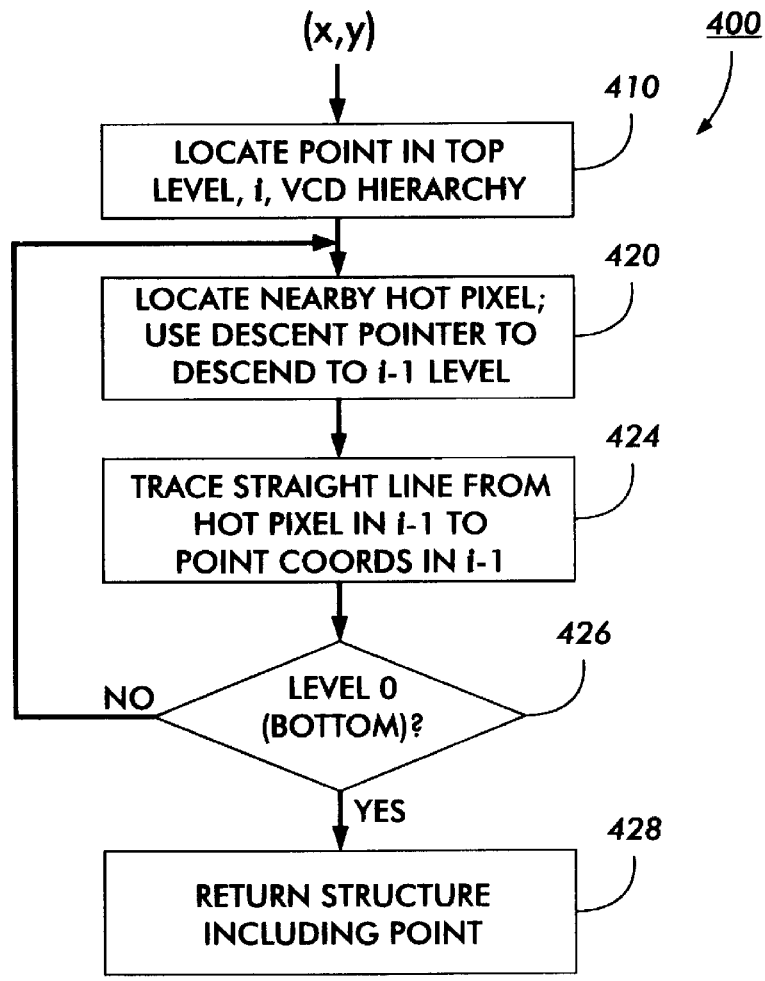
FIG. 19 is a flowchart showing the process for locating a point in the hierarchical image structure map data structure according to an illustrated embodiment of the present invention.
Figure 20:
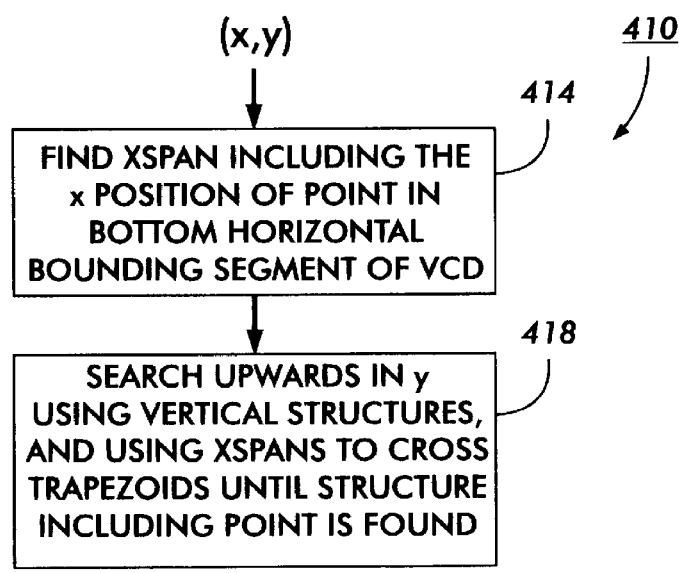
FIG. 20 is a flowchart illustrating point location in a single level of the image structure map data structure according to an illustrated embodiment of the present invention.

The data structures illustrated in FIGS. 9, 10 and 11 make it easy to move both vertically and horizontally in an ISM. Moving vertically from a vertex, vertical fragment, or vertical attachment is straightforward because each can have only one structure above and one below. Movement both vertically and horizontally is facilitated by the xspan structures. FIG. 19 is a flowchart showing point location operation 400 for locating a point in the ISM data structure hierarchy; FIG. 20 illustrates point location operation 410 for locating a point at a single level of the ISM. Point location operation 400 illustrates how the data structures illustrated in FIGS. 9, 10 and 11 are used to navigate through the ISM.

A point in the image may be located at a vertex, at a position on a fragment, at a position on a single or double vertical attachment, or in the interior of a trapezoid. Point location operation 400 takes as input a set of x, y coordinates that define a point in the coordinate system of the ISM. Point location operation 400 returns a vertex if the point is at a vertex, a floor and ceiling list entry that includes the point if the point is on a fragment, a vertical attachment if the point is on a vertical attachment, and, if the point is in the interior of a trapezoid, the ceiling (bottom) xspan of the trapezoid. Point location operation 400 may also be implemented to return a region.

With reference to FIG. 19, to locate a point at the bottom (most detailed) level of the hierarchy of the vertical cell decompositions that comprise the ISM, first locate it in the top (least detailed) VCD in the hierarchy, say at level i, in box 410. FIG. 20 shows technique 410 for locating a point in a level of the hierarchy in the illustrated embodiment. First, in box 414, the xspan containing the x coordinate of the point is found by linearly searching the ceiling list of the horizontal fragment that defines the bottom of the ISM's bounding rectangle. Then, in box 418, an upward search in y is carried out, using the vertical structures in the ISM (i.e., the vertices, vertical attachments and vertical fragments) and using xspans to cross trapezoids, until the image structure that contains the point is found.

Returning to FIG. 19, once the structure containing the point is found, a nearby vertex, which by definition is in a hot pixel, is found next, in box 420, using the image structure found by technique 410 and that structure's pointers; this nearby hot pixel is never more than a pointer or two away, because every cell has at least two hot pixels on its boundary. The descent pointer of the nearby hot pixel is then used, in box 420, to locate the corresponding hot pixel in the ISM one level down, at level i-1. To locate the point from a vertex (in a hot pixel) at level i1, a straight line is traced through the ISM from the hot pixel to the point, in box 424. The current level is tested, in box 426, to see if the bottom level of the hierarchy of partitions has been reached; if so, the structure that includes the point can be found using the pointers in the vertex data structure and the coordinates of the traced line, and this structure is then returned, in box 428. If the bottom level has not yet been reached, steps 420 and 424 are repeated until the bottom level of the hierarchy has been reached.

5. Computing the Color Descriptor.

In the illustrated embodiment, the signal property descriptor is a color descriptor for the region. A typical color image has a vector of three elements per pixel; the elements correspond to the amount of light in the red, green, and blue regions of the electromagnetic spectrum arriving at the pixel. Computing the color descriptor from signals in the original image requires as input an image region for which the color descriptor is to be computed. There may also be provided as input a color descriptor function that enables the color descriptor to be computed in different ways, as controlled by the function. In particular, the color that appears in a region may be a constant color, or the color may appear in the region of a rendered image as varying linearly over the region according to some color dimension. For some images, a varying color gives a preferred or more realistic appearance, or varying the color may create a desired special effect. In the case of the constant color, no input function need be specified, and the region signal property descriptor indicates an actual color value. In the case of the linearly varying color in the region, the input function specifies that the color is a linear fit over the region, and the signal property descriptor indicates a three-by-three (3×3) matrix of parameters, from which the color of each rendered image location may be computed.

To locate the source data from the original image that is required for computing a color descriptor, the two-dimensional extents of the region identified in the ISM are used to determine the image locations in the original image that correspond with the region in the ISM. The signal values of these original image locations are used to compute the color descriptor for the region. This computation is performed according to the input color descriptor function, if one is provided. The region data structure for the identified region in the ISM is then updated with the value for the color descriptor. Computing the color descriptor from signals in the original image may also further include using other image signal values in the computation, such as the signal values of adjacent image regions. Human perception of a given color is influenced by colors surrounding that color, and may be perceived differently when surrounded by different colors; computing a color descriptor may take into account color signal values in adjacent image regions. Note that determining the color descriptor, or any type of signal property descriptor, indicated by a region data item is done independently of the signal analysis operation used by the automatic segmentation operation 210 (FIG. 2) to determine the image region boundaries and vertices included in the original image.

The invention contemplates alternative ways of representing the color signals in an image region. For example, each image region may be subdivided into triangles, the process of which is called a triangulation, and Gouraud shading may be used to represent a predominant or average color that occurs in the subdivided triangular region. Gouraud shading is a process known in the art, and briefly involves specifying three points, in this case the vertices of a triangle, and specifying a color for each point. The Gouraud shading process linearly interpolates the colors among the three points. Because the triangles abut and share vertices, adjacent colors match at the boundaries of the abutting triangles.

D. The Software Product of the Invention.

Figure 21:
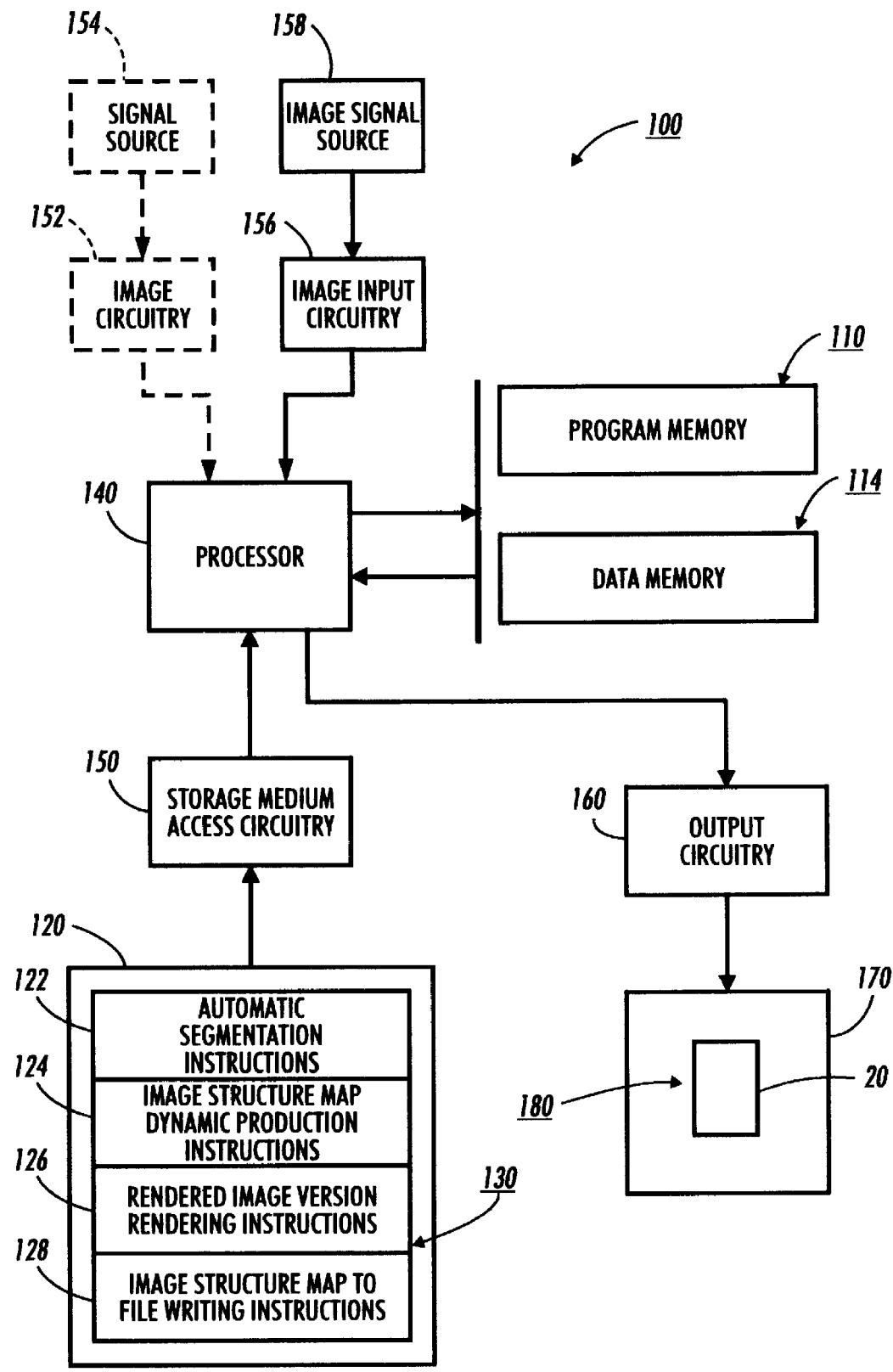
FIG. 21 is a block diagram schematically illustrating the software product of the present invention and its use in conjunction with a suitably configured machine.

FIG. 21 shows software product 120, an article of manufacture that can be used in a machine that includes components like those shown included in machine 100. Software product 120 includes data storage medium 130 that can be accessed by storage medium access circuitry 150. Data storage medium 130 stores instructions for executing the method of the present invention for rendering a rendered image version of an original image, as illustrated in FIG. 2, and may include instructions for performing the method according to the illustrated embodiment of the invention illustrated in the flowcharts of FIGS. 15–20.

Software product 120 may be commercially available to a consumer in the form of a shrink-wrap package that includes data storage medium 130 and appropriate documentation describing the product. In that case, a data storage medium is a physical medium that stores instruction data. Examples of data storage media include magnetic media such as floppy disks, diskettes and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of disks storing a single body of data would be a storage medium. "Storage medium access circuitry" is circuitry that can access data on a data storage medium. Storage medium access circuitry 150 may be contained in a distinct physical device into which data storage medium 130 is inserted in order for the storage medium access circuitry to access the data stored thereon. Examples of storage medium access devices include disk drives and CD-ROM readers. These may be physically separate devices from machine 100, or enclosed as part of a housing of machine 100 that includes other components.

Storage medium access circuitry 150 may also be incorporated as part of the functionality of machine 100, such as when storage medium access circuitry includes communications access software and circuitry in order to access the instruction data on data storage medium 130 when data storage medium 130 is stored as part of a remotely-located storage device, such as a server. Software product 120 may be commercially or otherwise available to a user in the form of a data stream indicating instruction data for performing the method of the present invention that is transmitted to the user over a communications facility from the remotely-located storage device. In the latter case, article 120 is embodied in physical form as signals stored on the remotely-located storage device; the user purchases or accesses a copy of the contents of data storage medium 130 containing instructions for performing the present invention, but typically does not purchase or acquire any rights in the actual remotely-located storage device. When software product 120 is provided in the form of a data stream transmitted to the user over a communications facility from the remotely-located storage device, instruction data stored on data storage medium 130 is accessible using storage medium access circuitry 150. Alternatively, a data stream transmitted to the user over a communications facility from the remotely-located storage device may be stored in some suitable local memory device of machine 100, which might be program memory 110, or a data storage medium locally accessible to machine 100 (not shown), which would then also be accessible using storage medium access circuitry 150.

Data storage medium 130 stores instruction data which is provided to processor 140 for execution when the method for rendering a rendered image version is to be used. The stored data includes automatic segmentation instructions 122; when these instructions are provided to processor 140, and processor 140 executes them, the machine is operated to perform the operations for analyzing an original image data structure and producing image region boundaries, as represented in box 210 in FIG. 2. When automatic segmentation is performed according to the illustrated embodiment, automatic segmentation instructions 122 include the Mega-Wave2 software that automatically segments an original image into regions of constant color.

The stored data further include image structure map dynamic production instructions 124; when these instructions are provided to processor 140, and processor 140 executes them, the machine is operated to perform the operations for inserting image region boundaries into the image structure map data structure, as represented in box 300 in FIG. 2; if software product 120 builds the image structure map according to the illustrated embodiment of the invention, image structure map dynamic production instructions perform the operations illustrated in the flowcharts of FIGS. 15–20.

The stored data further include data indicating rendering instructions 126 for rendering the rendered image version of the original image; when these instructions are provided to processor 140, and processor 140 executes them, the machine is operated to render a rendered image version of the original image from the image structure map data structure, as represented by box 440 of FIG. 2.

The stored data may also include data indicating file writing instructions 128 for writing the image structure map data structure to a file; when these instructions are provided to processor 140, and processor 140 executes them, the machine is operated to write the image structure map data structure to a file, as represented by box 450 of FIG. 2.

E. Miscellaneous Features.

1. Other signal property descriptors.

In the illustrated embodiment, the signal represented by the signal property descriptor was a color signal. However, original images suitable for processing by the method of the present invention may be composed of signals other than color, and, depending on the type of image, the signal can be a scalar or a vector. Scalar image signals include:

(1) intensity: the strength of the light striking each pixel in the image;

(2) range: at each pixel, the distance from the center of the camera along a line through that pixel to a point in the scene;

(3) height field: at each pixel, the distance, or height, of a point in the scene from a fixed horizontal plane; a common type of height field is referred to as terrain data; an image using this type of image signal is called a digital elevation map (DEM); and (4) disparity: given a stereo pair of images, where both cameras are facing the same direction, and the displacement between the cameras is horizontal (relative to the cameras) and orthogonal to that direction, a disparity image measures the horizontal distance between the two pixels, one from each camera, at which a point in the scene is imaged.

Vector image signals include:

(1) optical flow: given two consecutive images in an image sequence, an optical flow image is computed by finding the translation in the horizontal and vertical directions of each scene point from the first image to the second. Each pixel in the optical flow image is a vector containing the two translations for the corresponding pixel in the first image;

(2) texture: a measure of texture in an image can be computed at each pixel in an image by a set of filters or nonlinear functions, which yields a vector at each pixel; each pixel in the texture image is a vector containing the texture measures; and (3) multispectral: a multispectral image is a generalization of a color image that generally has more than three elements per pixel, where each element measures the amount of light in some region of the electromagnetic spectrum arriving at the pixel. These regions can include nonvisible parts of the spectrum, for example, infrared and ultraviolet light.

2. Computing Signal Property Descriptors.

When to compute signal property descriptors is an implementation decision, and several implementation alternatives are available. As image region boundaries are inserted into the ISM and new regions are created, an actual value of the signal property descriptor may be computed at the time it is determined that a new region has been added to the ISM. Or, alternatively, a default value for the signal property descriptor may be used at the time of creation, computing a signal property descriptor may be deferred to some later event or time, and an actual value computed only at the request of a user of or by a process that uses the ISM data structure, or automatically during a subsequent processing cycle, such as during rendering of an image from the ISM.

How a signal property descriptor value is computed also depends upon the particular implementation of an ISM. When the ISM representation of an original image is intended to capture image region signal information in the original image, as was the case in the illustrated embodiment described above, the signal property descriptor of each region data item in the ISM indicates the value of a smoothly varying property of the signals indicated by the original image locations included in the image region of the original image being represented by the respective region data item. Computing the signal property descriptor in that case means locating those image region signals in the original image and computing a signal value. When the ISM representation is not necessarily intended to capture the signal information in the original image, a user or some other operation may assign a signal value to a signal property descriptor.

The signal property descriptor of each region data item contains the information necessary to compute an approximation of the image signal at every point of the region. Two common types of approximations are constant and linear approximations. As noted in the discussion of the illustrated embodiment, the computed value of the signal property descriptor may itself include a function that indicates a value when computed later, for example, during a rendering operation of an image from the ISM.

3. Deleting ursegments from the image structure map.

If the image structure map is to be used in an interactive application in addition to producing a rendered image version of an original image, functionality to permit deletion of image region boundaries must be provided. An ursegment is deleted from the hierarchy of vertical cell decompositions that comprise the ISM by deleting it independently from each level. In the illustrated embodiment, the deletion operation takes as input an ursegment s that is to be deleted from an existing ISM, and the current ISM. Since ursegment s is represented in the ISM as a polysegment, which shall be referred to as polysegment σ, the first process in the deletion operation is to determine the fragments that comprise polysegment σ of the ursegment that is to be deleted. Those fragment data structures that are not included in any other ursegment are then deleted from the ISM by removing s from each fragment data structure's list of ursegments. When an ursegment list of a fragment data structure becomes empty, no existing ursegment stored in the ISM makes use of this fragment any longer, so the fragment data structure itself can then be deleted.

Certain fragments and vertices of existing ursegments were created when those ursegments passed through the hot pixels of ursegment s when s was originally added to the ISM; thus, the hot pixels created when s was added to the ISM need to be determined; the vertices of σ in these new hot pixels are deleted from the ISM if their inclusion in the ISM is the result solely of s having ended or intersected another ursegment in the pixel when s was added to the ISM. Determining these vertices can be decided efficiently by using the order in which the ursegments enter or leave each pixel determined to be a new hot pixel of s. Collectively, these deletion operations leave the ISM in the state in which it would have been had s never been inserted.

4. Level of detail required in an image structure map.

FIG. 4 shows the most general form of an image structure map, while FIGS. 9, 10 and 11 show an illustrated implementation that includes the explicit representation of data items that might otherwise be computed from other data in the ISM. The data that is explicitly represented in each of the component data structures of an ISM is an implementation choice determined primarily by the operations that the image structure map is designed to support. This implementation choice, in turn, must take into account the efficiency of the access to the image structures in the ISM in comparison with the storage requirements of the data structure. It may be determined experimentally that explicitly representing certain data in the data structure will result in faster access to image structures than could otherwise be achieved by computing the same information from other data in the data structure. Efficient access time may be a requirement for some types of operations with an image structure map, particularly for operations involving image interaction with a displayed view of the image being represented by the ISM. Such operations are described in copending, commonly assigned patent application Ser. No. 08/581,660, "User-Directed Interaction with an Image Structure Map Representation of an Image."

5. Using the ISM to Spatially Index the Original Image.

The image structure map representation used in the present invention spatially indexes the original image. The term "indexing" as used herein as it applies to an image is the operation of locating in the partition of the image an image structure that contains a selected query point specified by its coordinates in the coordinate system of the original image.

Spatial indexing is implemented in the present invention via three principles: the use of a partition to represent the topology of the image, an efficient indexing mechanism, and the use of the two-tier image region representation, and in particular, the use of bounded complexity subregions. A partition completely specifies the topology of the image; for any element of the partition, the data structure specifies all adjacent elements, either explicitly or in a manner that permits computing the order of these adjacent elements. Thus, every image structure in the image structure map knows what its neighboring structures are. The efficient indexing mechanism is the data structure hierarchy of two or more partitions, starting with a very coarse one at the top of the hierarchy and ending with the full image structure map for the image. The third principle supporting efficient spatial indexing is the the use of the two-tier image region representation, and in particular, the use of bounded complexity subregions. The representation of image regions in the image structure map as a collection of bounded complexity subregions provides a predictable level of efficiency for performing a search operation such that searching for an intersection location of a line segment with a side of an image region is performed in a fixed amount of time per cell searched for the intersection location. The representation of image regions in the image structure map at two distinct levels, that of region and that of cell, provides for additional flexibility in querying and manipulating image structures.

6. Building the ISM using a Batch Algorithm.

A partition that is constructed only for a given set of region boundaries that is known a priori, is referred to as a static partition and is constructed in what is known as a batch operation. In order to add a region boundary to or to delete a region boundary from the partition, a batch operation reconstructs the entire partition for each addition or deletion. The partition data structure that is the basis of the ISM of the present invention may be constructed as a static partition using a batch operation instead of being dynamically produced, as shown in the illustrated implementation; a static partition may be suitable for image operations that do not involve image interaction, and a batch operation may be a faster way to build the ISM.

The present invention produces an accurate version of an original image by taking advantage of an efficient and flexible image representation that accurately, compactly and explicitly represents the geometry, topology and signal properties of perceptually distinguishable regions in the original image. The ISM includes, for each region in the original image, a region data structure that indicates the adjacent region boundary data items that form the region and a signal property descriptor indicating the value of signals computed for or assigned to the region. Region boundary data items represent perceptually distinguishable image region boundaries that are determined to occur in the original image as a result of analyzing signal properties of original image locations. Vertices have topologically and geometrically accurate machine representable values resulting from modifying exact higher precision vertex values using a rounding operation that mathematically ensures topological and geometric consistency with the original image. The ISM is dynamically produced and so permits dynamic modification. The ISM serves as a useful substitute data structure for archival purposes, and the rendered image version of the original image may serve as a surrogate for the original image in many applications.

While the invention has been described in conjunction with a specific embodiment, this description is not intended to limit the invention in any way. Accordingly, the invention as described herein is intended to embrace all modifications and variations that are apparent to those skilled in the art and that fall within the scope of the appended claims.

What is claimed is:

1. A method for operating a processor-controlled machine to produce a rendered image version of an input original image on a display device; the machine including image input circuitry for receiving image definition data defining the input original image; memory for storing data; output circuitry connected to the display device; and a processor connected for accessing instruction data stored in the memory for operating the machine; the processor being further connected for receiving the input original image from the image input circuitry, and connected for providing image definition data defining images to the output circuitry for presenting the rendered image version on the display device; the method comprising:

performing an automatic image segmentation operation using the input original image; the automatic image segmentation operation determining image region boundaries occurring in the input original image between image regions therein by detecting a discontinuity in a value of a smoothly varying signal property of signal values indicated by original image locations in the original image; an image region in the original image being indicated by a coherent area of original image locations in which the signal values vary smoothly; an image region boundary occurring at a discontinuity in the smoothly varying signal values;

producing a partition data structure representation, referred to as a partition, of the original image using the image region boundaries determined by the automatic image segmentation operation; the partition indicating a plurality of nonoverlapping image regions of a 2D plane induced by the set of image region boundaries; the partition being produced dynamically by inserting image region boundaries one at a time therein; the partition including, for each image region in the original image, a region data structure including region boundary data items each indicating an adjacent image region boundary of the image region in the original image; the region data structure further including a plurality of vertex data items each indicating a vertex location adjacent to a region boundary data item included in the region data structure, wherein a vertex location refers to an endpoint location of a respective one of the image region boundaries or an intersection location between two image region boundaries;

each vertex data item having a machine representable value when stored in the partition; the machine representable value being computed by applying a rounding operation to an exact higher precision value for the vertex location of the respective image region boundary and modifying the exact value to produce the machine representable value; modifying the vertex location of an image region boundary producing a rounded image region boundary represented by the region boundary data item;

rendering a rendered image version of the original image using the partition data structure; the rendered image version showing the image regions determined to be included in the original image; and presenting the rendered image version of the original image on a display device.

2. The method for operating a processor-controlled machine to produce a rendered image version of an input original image of claim 1 wherein the rendered image version shows the image region boundaries determined to be included in the original image; the rendered image version of the original image having an appearance of a line drawing of the original image.

3. The method for operating a processor-controlled machine to produce a rendered image version of an input original image of claim 1 wherein each respective region data item included in the partition further indicates a signal property descriptor data item indicating a smoothly varying function of signals included in locations in the original image determined to be included in the image region represented by the respective region data item; the partition including the signal property descriptor being referred to as an image structure map; and wherein the rendered image version shows the value of the signal property descriptor of each image region determined to be included in the original image.

4. The method for operating a processor-controlled machine of claim 3 wherein the signal property descriptor is a color descriptor indicating a color function representing color values of the locations in the original image represented by a respective region data item; and wherein the rendered image version of the original image shows, in each image region represented by a respective region data item, a value for the color function indicated by the respective region data item.

5. The method for operating a processor-controlled machine of claim 4 wherein the color function representing the color value of the image locations in the original image is a constant function indicating a single color value for the image region; and wherein the rendered image version of the original image shows a constant color value in each image region determined to be included in the original image.

6. The method for operating a processor-controlled machine of claim 4 wherein the color function representing color values of the image locations in the original image is a linear function; the color descriptor indicating that the color values for a respective image region vary linearly within the image region; and wherein the rendered image version of the original image shows color values varying linearly in each image region.

7. The method for operating a processor-controlled machine of claim 3 wherein, when the smoothly varying function of signals indicated by the signal property descriptor indicates a function of signal values other than color values in image locations in the original image, rendering the rendered image version of the original image using the image structure map data structure includes representing the signal values of locations in the original image in each image region as color values; the rendered image version showing a color value indicating each image region determined to be included in the original image.

8. The method for operating a processor-controlled machine to produce a rendered image version of an input original image of claim 1 further including storing the partition data structure in a data base of partition representations of original images.

9. The method for operating a processor-controlled machine to produce a rendered image version of an input original image of claim 1 further including storing the rendered image version of the original image in a data base of rendered image versions of original images.

10. The method for operating a processor-controlled machine to produce a rendered image version of an input original image of claim 1 wherein the original image definition data structure indicates a digital image representation of a continuous-tone color image; the rendered image version of the original image further showing, in each respective image region determined to be included in the original image, a color value of the respective image region.

11. A method for operating a processor-controlled machine to automatically produce a data store of image structure map data structure representations of a plurality of original image definition data structures, referred to as original images; the machine including image input circuitry for receiving image definition data defining an original image; memory for storing data; and a processor connected for accessing instruction data stored in the memory for operating the machine; the processor being further connected for receiving original images from the image input circuitry; the method comprising:

performing, for each original image, an automatic image segmentation operation using the original image; the automatic image segmentation operation determining image region boundaries occurring in the original image between image regions therein by detecting a discontinuity in a value of a smoothly varying signal property of signal values indicated by original image locations in the original image; an image region in the original image being indicated by a coherent area of original image locations in which the signal values vary smoothly; an image region boundary occurring at a discontinuity in the smoothly varying signal values;

producing, for each original image, an image structure map data structure representation of the original image using the image region boundaries determined by the automatic image segmentation operation; the image structure map indicating a partition of a 2D plane induced by the set of image region boundaries into a plurality of nonoverlapping image regions included in the original image;

the image structure map being produced dynamically by inserting image region boundaries one at a time therein; the image structure map including, for each image region in the original image, a region data structure including region boundary data items each indicating an adjacent image region boundary of the image region in the original image; the region data structure further including a plurality of vertex data items each indicating a vertex location adjacent to a region boundary data item included in the region data structure, wherein a vertex location refers to an endpoint location of a respective one of the image region boundaries or an intersection location between two image region boundaries;

each vertex data item having a machine representable value when stored in the image structure map; the machine representable value being computed by applying a rounding operation to an exact higher precision value for the vertex location of the respective image region boundary and modifying the exact value to produce the machine representable value; modifying the vertex location of an image region boundary producing a rounded image region boundary represented by the region boundary data item;

computing a signal property descriptor data item for each respective image region determined to be included in the original image; the signal property descriptor indicating a smoothly varying function of signals included in locations in the respective image region; and for each image structure map representation of an original image, storing the image structure map in a data store of image structure map representations of original images; a rendered image version of the original image being capable of being rendered using the image structure map representation of the original image; the rendered image version showing the image regions determined to be included in the original image and showing the value of the signal property descriptor of each image region represented in the image structure map.

12. The method of claim 11 for operating a processor-controlled machine to produce a data store of image structure map representations of original images wherein, when the number of image regions determined to be included in the original image is less than the number of image locations in the original image, the image structure map is a compressed representation of the original image.

13. The method of claim 12 for operating a processor-controlled machine wherein the signal property descriptor is a color descriptor indicating a color function representing color values of the locations in the original image represented by a respective region data item; and wherein, when a rendered image version of the original image is rendered using the image structure map, the rendered image version of the original image shows, in each image region represented by a respective region data item, a value for the color function indicated by the respective region data item.

14. The method for operating a processor-controlled machine of claim 11 wherein the original image definition data structure indicates a digital image representation of a continuous-tone color image; and wherein, when a rendered image version of the original image is rendered using the image structure map, the rendered image version of the original image further shows, in each respective image region determined to be included in the original image, a color value of the respective image region.

15. An article of manufacture for use by a processor-controlled machine for producing a rendered image version of an input original image on a display device; the machine including image input circuitry for receiving image definition data defining the input original image; memory for storing data; output circuitry connected to the display device; and a processor connected for accessing instruction data stored in the memory for operating the machine; the processor being further connected for receiving the input original image from the image input circuitry, and connected for providing image definition data defining images to the output circuitry for presenting the rendered image version on the display device; the processor being further connected for receiving data from the storage medium access circuitry; the article comprising:

a data storage medium that can be accessed by the storage medium access circuitry when the article is used by the machine; and data stored in the data storage medium so that the storage medium access circuitry can provide the stored data to the processor when the article is used by the machine; the stored data comprising instruction data indicating instructions the processor can execute;

the processor, in executing the instructions, performing an automatic image segmentation operation using the input original image; the automatic image segmentation operation determining image region boundaries occurring in the input original image between image regions therein by detecting a discontinuity in a value of a smoothly varying signal property of signal values indicated by original image locations in the original image; an image region in the original image being indicated by a coherent area of original image locations in which the signal values vary smoothly; an image region boundary occurring at a discontinuity in the smoothly varying signal values;

the processor, further in executing the instructions, producing a partition data structure representation, referred to as a partition, of the original image using the image region boundaries determined by the automatic image segmentation operation; the partition indicating a plurality of nonoverlapping image regions of a 2D plane induced by the set of image region boundaries;

the partition being produced dynamically by inserting image region boundaries one at a time therein; the partition including, for each image region in the original image, a region data structure including region boundary data items each indicating an adjacent image region boundary of the image region in the original image; the region data structure further including a plurality of vertex data items each indicating a vertex location adjacent to a region boundary data item included in the region data structure, wherein a vertex location refers to an endpoint location of a respective one of the image region boundaries or an intersection location between two image region boundaries;

each vertex data item having a machine representable value when stored in the partition; the machine representable value being computed by applying a rounding operation to an exact higher precision value for the vertex location of the respective image region boundary and modifying the exact value to produce the machine representable value; modifying the vertex location of an image region boundary producing a rounded image region boundary represented by the region boundary data item;

the processor, further in executing the instructions, rendering a rendered image version of the original image using the partition data structure; the rendered image version showing the image regions determined to be included in the original image;

the processor, still further in executing the instructions, presenting the rendered image version of the original image on a display device.

16. The article of manufacture of claim 15 wherein the rendered image version shows the image region boundaries determined to be included in the original image; the rendered image version of the original image having an appearance of a line drawing of the original image.

17. The article of manufacture of claim 15 wherein each respective region data item included in the partition further indicates a signal property descriptor data item indicating a value of a smoothly varying function of signals included in locations in the original image determined to be included in the image region represented by the respective region data item; the partition including the signal property descriptor being referred to as an image structure map; and wherein the rendered image version shows the value of the signal property descriptor of each image region determined to be included in the original image.

18. The article of manufacture of claim 17 wherein the signal property descriptor is a color descriptor indicating a color function representing color values of the locations in the original image represented by a respective region data item; and wherein the rendered image version of the original image shows, in each image region represented by a respective region data item, a value for the color function indicated by the respective region data item.

* * * * *